(12) United States Patent
Chen et al.

(10) Patent No.: US 12,482,107 B2
(45) Date of Patent: Nov. 25, 2025

(54) SYSTEMS AND METHODS FOR FEATURE INFORMATION DETERMINATION

(71) Applicant: SHANGHAI UNITED IMAGING HEALTHCARE CO., LTD., Shanghai (CN)

(72) Inventors: Xiang Chen, Shanghai (CN); Yang Li, Shanghai (CN); Saisai Su, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 399 days.

(21) Appl. No.: 18/147,688

(22) Filed: Dec. 28, 2022

(65) Prior Publication Data

US 2023/0206454 A1 Jun. 29, 2023

(30) Foreign Application Priority Data

Dec. 29, 2021 (CN) .......................... 202111640729.1
May 24, 2022 (CN) .......................... 202210569703.0

(51) Int. Cl.
*G06T 7/11* (2017.01)
*G06T 7/00* (2017.01)
*G06T 7/155* (2017.01)

(52) U.S. Cl.
CPC .............. *G06T 7/11* (2017.01); *G06T 7/0012* (2013.01); *G06T 7/155* (2017.01)

(58) Field of Classification Search
CPC ......... G06T 7/11; G06T 7/0012; G06T 7/155; G06T 2207/10088; G06T 2207/20016; G06T 2207/20084; G06T 2207/20221; G06T 2207/30048; G06T 2207/30056
See application file for complete search history.

(56) References Cited

U.S. PATENT DOCUMENTS

| | | | |
|---|---|---|---|
| 9,194,925 B2 | 11/2015 | Zhong et al. | |
| 10,261,152 B2 | 4/2019 | Reeder et al. | |
| 10,393,838 B2 | 8/2019 | Hernando | |
| 10,534,057 B2 | 1/2020 | Liu et al. | |

(Continued)

FOREIGN PATENT DOCUMENTS

| | | |
|---|---|---|
| CN | 105930665 B | 6/2018 |
| CN | 109124633 A | 1/2019 |

(Continued)

OTHER PUBLICATIONS

The Extended European Search Report in European Application No. 22216825.4 mailed on Jun. 5, 2023, 9 pages.

(Continued)

*Primary Examiner* — John B Strege
(74) *Attorney, Agent, or Firm* — METIS IP LLC

(57) ABSTRACT

The present disclosure is related to systems and methods for feature information determination. The method may include obtaining at least one image including a subject. The method may include determining a segmentation result by segmenting the at least one image using at least one segmentation model. The segmentation result may include at least one target region of the subject in the at least one image. The method may include determining feature information of the at least one target region based on at least one parameter of the at least one target region.

20 Claims, 12 Drawing Sheets

(56) References Cited

U.S. PATENT DOCUMENTS

| | | |
|---|---|---|
| 10,646,134 B2 | 5/2020 | Leporq et al. |
| 10,743,791 B2 | 8/2020 | Reeder et al. |
| 2011/0054295 A1 | 3/2011 | Masumoto et al. |
| 2012/0207366 A1 | 8/2012 | Liu |
| 2015/0324999 A1* | 11/2015 | Gritsenko ............... G06T 7/174 382/132 |
| 2017/0148156 A1 | 5/2017 | Bregman-Amitai et al. |
| 2017/0217102 A1 | 8/2017 | Mansi et al. |
| 2018/0184973 A1 | 7/2018 | Nayak |
| 2019/0130576 A1 | 5/2019 | Wu et al. |
| 2020/0174090 A1 | 6/2020 | Leinhard |
| 2021/0090254 A1 | 3/2021 | Gong et al. |
| 2021/0166395 A1* | 6/2021 | Chen ........................ G06T 7/11 |
| 2021/0248741 A1 | 8/2021 | Kannengiesser et al. |
| 2021/0311145 A1 | 10/2021 | Keerthivasan et al. |
| 2022/0301154 A1 | 9/2022 | Li et al. |
| 2022/0366649 A1* | 11/2022 | Zang ....................... G06T 7/344 |
| 2023/0343063 A1* | 10/2023 | Xu ......................... G06V 10/82 |

FOREIGN PATENT DOCUMENTS

| | | |
|---|---|---|
| CN | 108872901 B | 6/2020 |
| CN | 111681251 A | 9/2020 |
| CN | 112834969 A | 5/2021 |
| CN | 113409310 A | 9/2021 |
| CN | 114266760 A | 4/2022 |
| EP | 2810598 A1 | 12/2014 |
| WO | 2022089221 A1 | 5/2022 |

OTHER PUBLICATIONS

Ma, Burton et al., Liver Segmentation in Color Images, SPIE Medical Imaging, 2017, 5 pages.

First Office Action in Chinese Application No. 202210569703.0 mailed on Mar. 18, 2025, 18 pages.

Deng, Zhiqi et al., The Application Progression on Imaging Techniques in the Diagnosis and Treatment of Thyroid Diseases, Chinese Journal of Modern Operative Surgery, 19(2): 155-160, 2015.

* cited by examiner

SYSTEMS AND METHODS FOR FEATURE INFORMATION DETERMINATION

CROSS-REFERENCE TO RELATED APPLICATIONS

This application claims priority of Chinese Patent Application No. 202111640729.1, filed on Dec. 29, 2021, and Chinese Patent Application No. 202210569703.0, filed on May 24, 2022, the contents of each of which are hereby incorporated by reference.

TECHNICAL FIELD

This disclosure generally relates to systems and methods for image processing, and more particularly, relates to systems and methods for image segmentation and feature information determination of an image.

BACKGROUND

Medical imaging techniques, such as a magnetic resonance imaging (MRI) technique, a computed tomography (CT) imaging technique, or the like, have been widely used for disease diagnosis and treatment. In some occasions, an image of a subject may be obtained according to a medical imaging technique, and a target region, such as a region representing a specific organ, may need to be segmented from the image. For example, a whole liver region of a patient may be segmented from an MRI image of the patient for further analysis based on a manual input of a doctor. However, a manual image segmentation may be time-consuming and inefficient. Accuracy and efficiency of the subsequent image processing and analysis (e.g., feature information determination of an image) relies on precision segmentation of the image. Therefore, it is desirable to provide systems and methods for image segmentation, thereby improving the accuracy and/or efficiency of medical analysis and/or diagnosis.

SUMMARY

According to an aspect of the present disclosure, a method for feature information determination may be implemented on a computing device including at least one processor and at least one storage device. The method may include obtaining at least one image including a subject. The method may include determining a segmentation result by segmenting the at least one image using at least one segmentation model. The segmentation result may include at least one target region of the subject in the at least one image. The method may include determining feature information of the at least one target region based on at least one parameter of the at least one target region.

In some embodiments, the at least one image may include a morphological image. The method may include obtaining a functional image corresponding to the morphological image. The method may include determining at least one second target region in the functional image corresponding to the at least one target region in the morphological image by registering the functional image and the morphological image. The method may include designating at least one parameter of the at least one second target region in the functional image as the at least one parameter of the at least one target region in the morphological image. The method may include determining the feature information of the at least one target region based on the at least one parameter of the at least one target region.

In some embodiments, the at least one image may include a functional image. The method may include obtaining the at least one parameter of the at least one target region in the functional image. The method may include determining the feature information of the at least one target region based on the at least one parameter of the at least one target region.

In some embodiments, the method may include outputting a report based on the feature information of the at least one target region.

In some embodiments, the subject may be liver tissue. The at least one target region may include at least one of a whole liver, a liver segment, or a liver lesion region.

In some embodiments, the morphological image may include at least one of a magnetic resonance imaging (MRI) image, or a computed tomography (CT) image. The functional image may include at least one of a diffusion functional image, a perfusion functional image, or a fat functional image.

In some embodiments, the at least one image may include a first image. The at least one segmentation model may include a first segmentation model and a second segmentation model. The method may include determining a preliminary segmentation result by segmenting the first image using the first segmentation model. The method may include determining a target segmentation result based on the preliminary segmentation result using the second segmentation model. The method may include determining a target image based on the target segmentation result. The method may include determining the at least one target region based on the target image.

In some embodiments, the at least one image may further include a second image. The method may include processing the second image based on the preliminary segmentation result to generate a processed second image. The method may include determining the target segmentation result by segmenting the processed second image using the second segmentation model.

In some embodiments, the method may include determining the target segmentation result by segmenting the preliminary segmentation result using the second segmentation model.

In some embodiments, the subject may be liver tissue. The method may include identifying a falciform ligament of the liver tissue based on the at least one image using a falciform ligament recognition model.

In some embodiments, the target segmentation result may be a 3D image including a plurality of slices of the subject. The method may include determining a left liver region and a right liver region in the target segmentation result based on the falciform ligament of the liver tissue. The method may include selecting a slice from the plurality of slices of the target segmentation result as the target image based on feature information of the plurality of slices. The method may include determining a first count of regions of interest (ROIs) in the left liver region in the target image and a second count of ROIs in the right liver region in the target image based on an area ratio of the left liver region and the right liver region in the target image. The method may include determining the at least one target region based on the first count of ROIs in the left liver region in the target image and the second count of ROIs in the right liver region in the target image.

In some embodiments, the method may include identifying a vascular region in the target segmentation result using a vascular recognition model. The method may include determining the target image by removing the vascular region from the target segmentation result.

In some embodiments, the method may include dividing the target image into a plurality of sub-regions. The method may include determining at least one ROI in each of the plurality of sub-regions based on a count of ROIs and a size of an ROI. The method may include determining the at least one target region based on a plurality of ROIs in the plurality of sub-regions.

In some embodiments, the subject may be liver tissue. The at least one segmentation model may include a liver segment recognition model. The method may include determining a plurality of liver segment regions of the liver tissue based on the at least one image using the liver segment recognition model. The method may include determining the at least one target region based on the plurality of liver segment regions.

According to another aspect of the present disclosure, a system for feature information determination may include at least one storage medium including a set of instructions, and at least one processor in communication with the at least one storage medium. When executing the set of instructions, the at least one processor may be directed to cause the system to perform a method. The method may include obtaining at least one image including a subject. The method may include determining a segmentation result by segmenting the at least one image using at least one segmentation model. The segmentation result may include at least one target region of the subject in the at least one image. The method may include determining feature information of the at least one target region based on at least one parameter of the at least one target region.

According to another aspect of the present disclosure, a non-transitory computer readable medium may include at least one set of instructions. When executed by at least one processor of a computing device, the at least one set of instructions may cause the at least one processor to effectuate a method. The method may include obtaining at least one image including a subject. The method may include determining a segmentation result by segmenting the at least one image using at least one segmentation model. The segmentation result may include at least one target region of the subject in the at least one image. The method may include determining feature information of the at least one target region based on at least one parameter of the at least one target region.

According to another aspect of the present disclosure, a system may include an obtaining module, a first determination module, and a second determination module. The obtaining module may be configured to obtain at least one image including a subject. The first determination module may be configured to determine a segmentation result by segmenting the at least one image using at least one segmentation model. The segmentation result may include at least one target region of the subject in the at least one image. The second determination module may be configured to determine feature information of the at least one target region based on at least one parameter of the at least one target region.

According to another aspect of the present disclosure, a device may include at least one storage medium including a set of instructions, and at least one processor in communication with the at least one storage medium. When executing the set of instructions, the at least one processor may be directed to cause the device to perform a method. The method may include obtaining at least one image including a subject. The method may include determining a segmentation result by segmenting the at least one image using at least one segmentation model. The segmentation result may include at least one target region of the subject in the at least one image. The method may include determining feature information of the at least one target region based on at least one parameter of the at least one target region.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
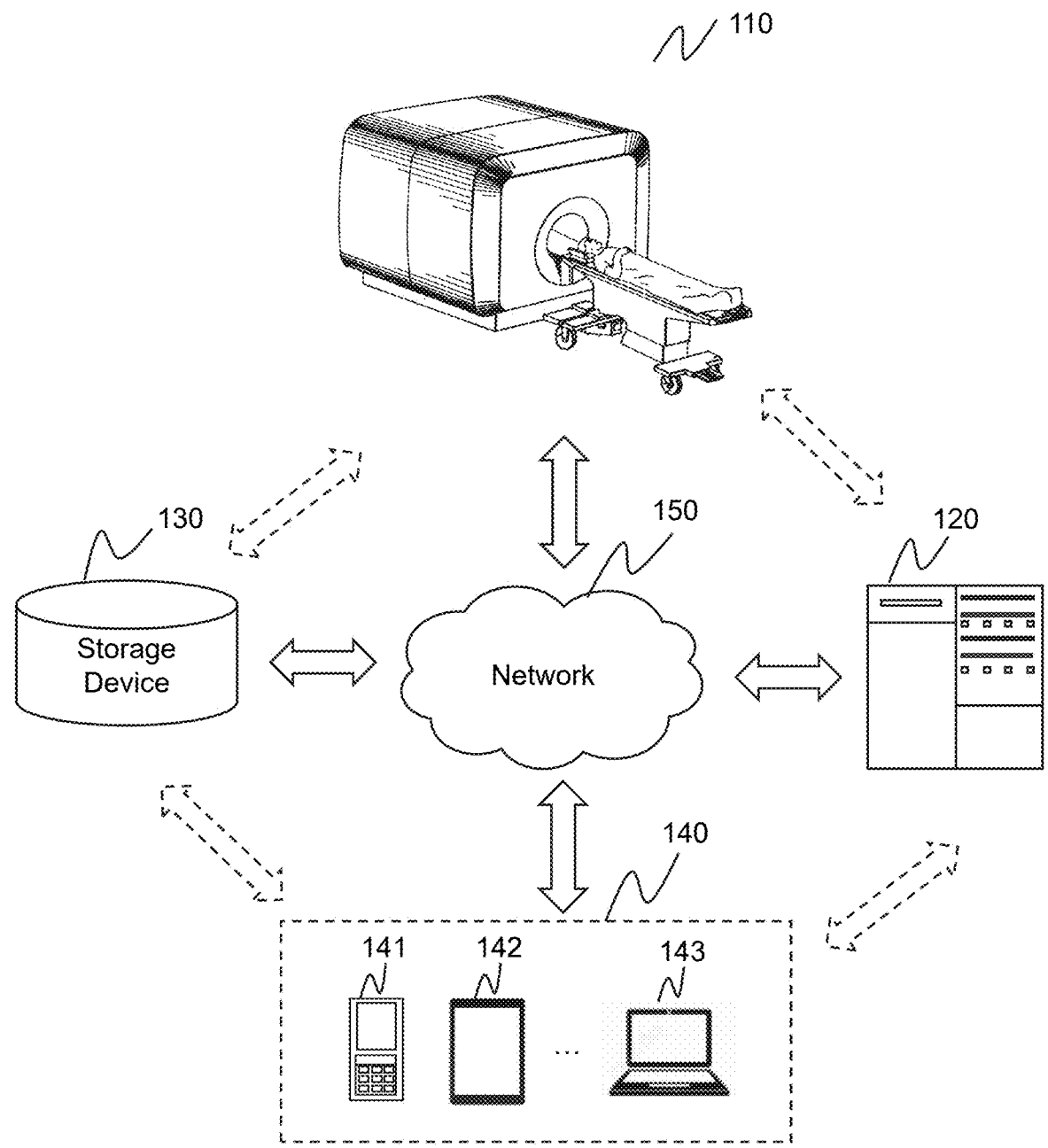
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections, or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "image" in the present disclosure is used to collectively refer to image data (e.g., scan data, projection data) and/or images of various forms, including a two-dimensional (2D) image, a three-dimensional (3D) image, a four-dimensional (4D), etc. The term "anatomical structure" in the present disclosure may refer to gas (e.g., air), liquid (e.g., water), solid (e.g., stone), cell, tissue, organ of a subject, or any combination thereof, which may be displayed in an image and really exist in or on the subject's body. The term "region," "location," and "area" in the present disclosure may refer to a location of an anatomical structure shown in the image or an actual location of the anatomical structure existing in or on the subject's body, since the image may indicate the actual location of a certain anatomical structure existing in or on the subject's body. The term "an image of a subject" may be referred to as the subject for brevity.

An aspect of the present disclosure relates to systems and methods for image segmentation and feature information determination of an image. According to some embodiments of the present disclosure, a processing device may obtain at least one image including a subject. The processing device may determine a segmentation result by segmenting the at least one image using at least one segmentation model. The segmentation result may include at least one target region of the subject in the at least one image. The processing device may determine feature information of the at least one target region based on at least one parameter of the at least one target region.

According to some embodiments of the present disclosure, the segmentation result may be determined by inputting the at least one image into the segmentation model, and the feature information of the at least one target region may be determined based on at least one parameter of the at least one target region. Therefore, the methods and systems disclosed herein can improve the accuracy and efficiency of the image segmentation by, e.g., reducing the workload of a user, cross-user variations, and the time needed for the image segmentation. The accuracy and credibility of the feature information of the at least one target region determined based on the segmentation result may also be improved.

FIG. 1 is a schematic diagram illustrating an exemplary medical system according to some embodiments of the present disclosure. As illustrated, a medical system 100 may include a medical device 110, a processing device 120, a storage device 130, a terminal 140, and a network 150. The components of the medical system 100 may be connected in one or more of various ways. Merely by way of example, as illustrated in FIG. 1, the medical device 110 may be connected to the processing device 120 directly as indicated by the bi-directional arrow in dotted lines linking the medical device 110 and the processing device 120, or through the network 150. As another example, the storage device 130 may be connected to the medical device 110 directly as indicated by the bi-directional arrow in dotted lines linking the medical device 110 and the storage device 130, or through the network 150. As still another example, the terminal 140 may be connected to the processing device 120 directly as indicated by the bi-directional arrow in dotted lines linking the terminal 140 and the processing device 120, or through the network 150.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof. The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, a liver, the stomach, a blood vessel, soft tissue, a tumor, or the like, or any combination thereof.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device, a computed tomography (CT) device, an ultrasound (US) device, an X-ray imaging device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

The processing device 120 may process data and/or information obtained from the medical device 110, the storage device 130, and/or the terminal(s) 140. For example, the processing device 120 may obtain at least one image including a subject. As another example, the processing device 120 may determine a segmentation result by segmenting at least one image using at least one segmentation model. As another example, the processing device 120 may determine feature information of at least one target region based on at least one parameter of the at least one target region. In some embodiments, the processing device 120 may be a single server or a server group. The server group may be centralized or distributed. In some embodiments, the processing device 120 may be local or remote. For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store at least one image of a subject acquired by a medical device (e.g., the medical device 110). As another example, the storage device 130 may store at least one segmentation model determined by the processing device 120. As another example, the storage device 130 may store a segmentation result, at least one parameter of at least one target region, and/or feature information of at least one target region determined by the processing device 120. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), a high-speed RAM, etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140). One or more components in the medical system 100 may access the data or instructions stored in the storage device 130 via the network 150. In some embodiments, the storage device 130 may be integrated into the medical device 110.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, etc.) may communicate information and/or data with one or more other components of the medical system 100 via the network 150. For example, the processing device 120 and/or the terminal 140 may obtain at least one image of a subject from the medical device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a Zig-Bee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
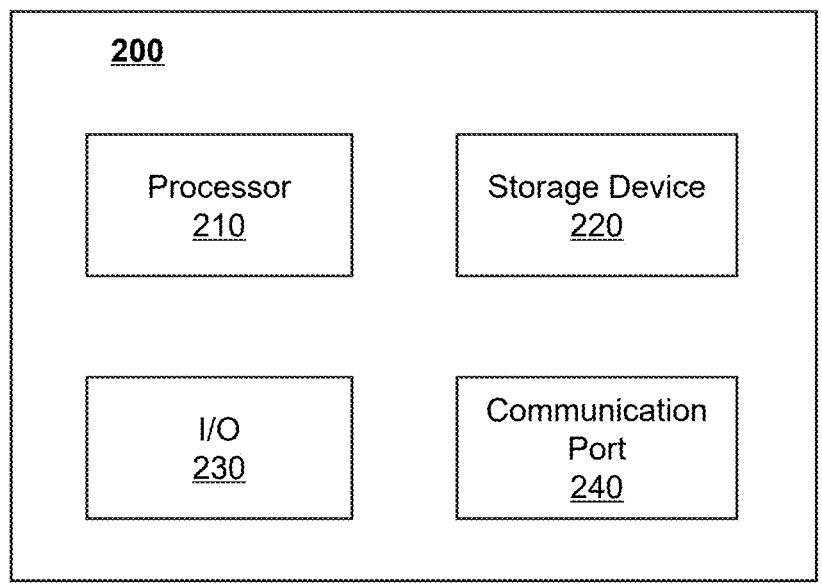
FIG. 2 is a schematic diagram illustrating exemplary hardware and/or software components of an exemplary computing device on which a processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
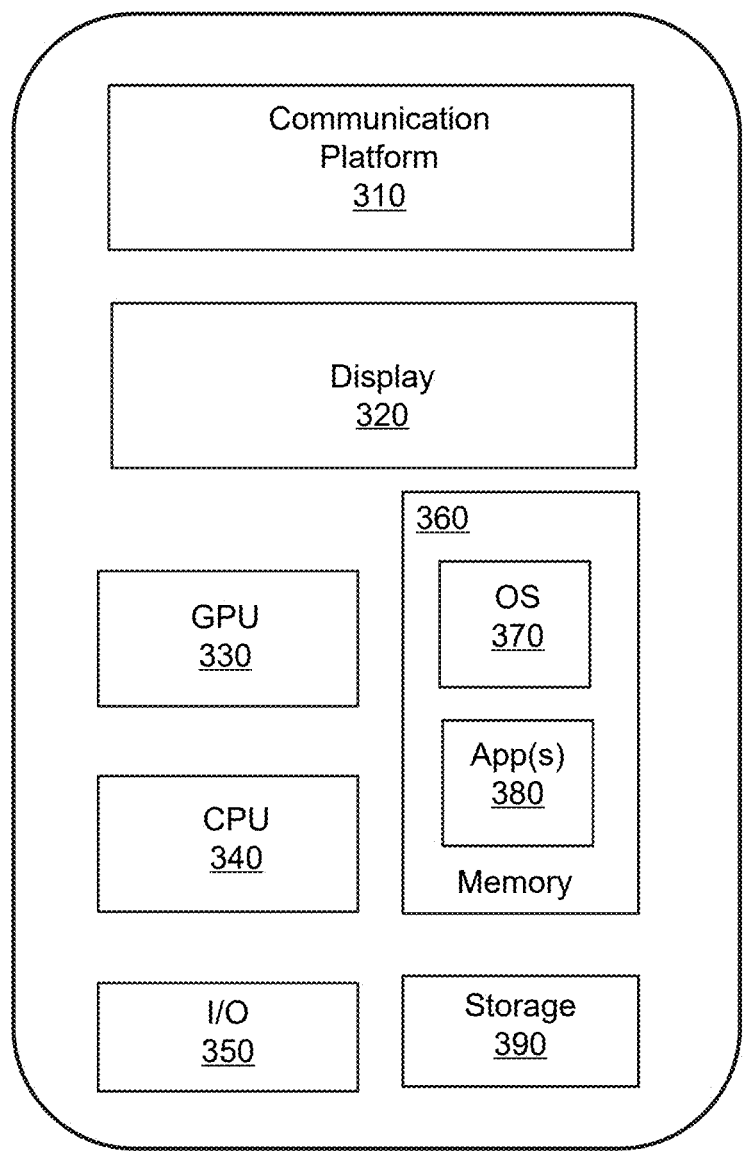
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™, Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
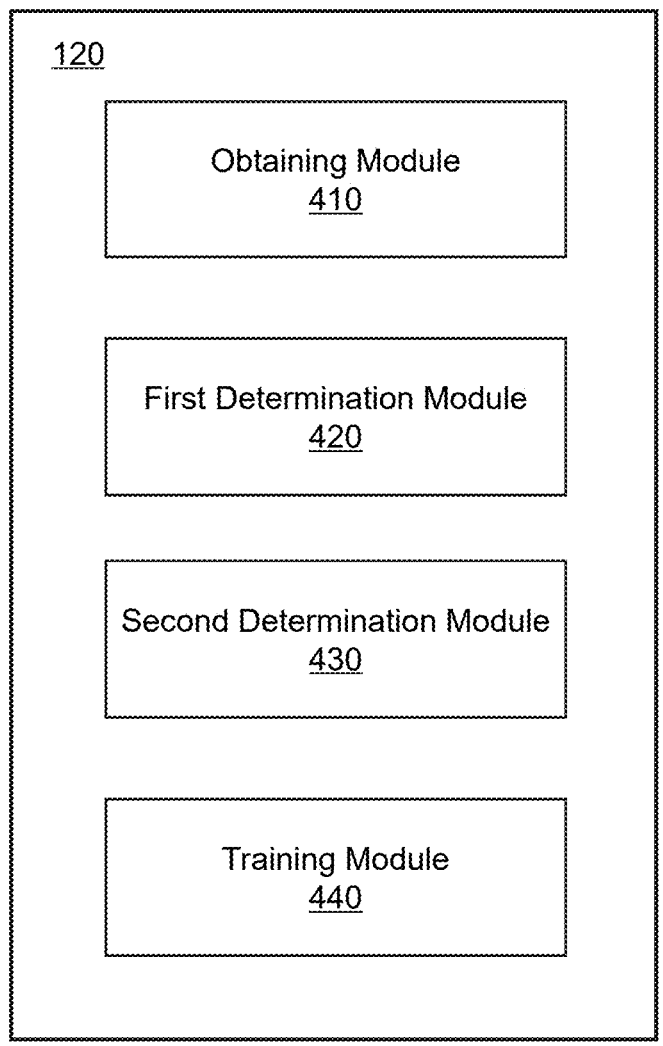
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include an obtaining module 410, a first determination module 420, a second determination module 430, and a training module 440.

The obtaining module 410 may be configured to obtain data and/or information associated with the medical system 100. The data and/or information associated with the medical system 100 may include at least one image including a subject, at least one segmentation model, or the like, or any combination thereof. In some embodiments, the obtaining module 410 may obtain the data and/or information associated with the medical system 100 from one or more components (e.g., the medical device 110, the storage device 130, the terminal 140) of the medical system 100 via the network 150.

The first determination module 420 may be configured to determine a segmentation result by segmenting at least one image using at least one segmentation model. In some embodiments, the first determination module 420 may determine a preliminary segmentation result by segmenting a first image using a first segmentation model. The first determination module 420 may determine a target segmentation result based on the preliminary segmentation result using a second segmentation model. The first determination module 420 may determine a target image based on the target segmentation result. The first determination module 420 may determine at least one target region based on the target image. More descriptions for determining the at least one target region may be found elsewhere in the present disclosure (e.g., operation 520 in FIG. 5, FIG. 7, and descriptions thereof). In some embodiments, the first determination module 420 may identify a falciform ligament of liver tissue based on at least one image using a falciform ligament recognition model. The first determination module 420 may determine a left liver region and a right liver region in a target segmentation result based on the falciform ligament of the liver tissue. The first determination module 420 may select a slice from a plurality of slices of the target segmentation result as a target image based on feature information of the plurality of slices. The first determination module 420 may determine a first count of regions of interest (ROIs) in the left liver region in the target image and a second count of ROIs in the right liver region in the target image based on an area ratio of the left liver region and the right liver region in the target image. The first determination module 420 may determine at least one target region based on the first count of ROIs in the left liver region in the target image and the second count of ROIs in the right liver region in the target image. More descriptions for determining the at least one target region may be found elsewhere in the present disclosure (e.g., operation 520 in FIG. 5, FIG. 8, and descriptions thereof).

The second determination module 430 may be configured to determine feature information of at least one target region based on at least one parameter of the at least one target region. In some embodiments, the second determination module 430 may obtain a functional image corresponding to a morphological image. The second determination module 430 may determine at least one second target region in the functional image corresponding to at least one target region in the morphological image by registering the functional image and the morphological image. The second determination module 430 may designate at least one parameter of the at least one second target region in the functional image as the at least one parameter of the at least one target region in the morphological image. The second determination module 430 may determine feature information of the at least one target region based on the at least one parameter of the at least one target region. In some embodiments, the second determination module 430 may obtain at least one parameter of at least one target region in a functional image. The second determination module 430 may determine feature information of the at least one target region based on the at least one parameter of the at least one target region. More descriptions for determining the feature information of the at least one target region may be found elsewhere in the present disclosure (e.g., operation 530 in FIG. 5, FIG. 6, and descriptions thereof).

The training module 440 may be configured to determine a trained model. In some embodiments, the trained model may include a segmentation model (e.g., a first segmentation model, a second segmentation model), a falciform ligament recognition model, a vascular recognition model, a liver segment recognition model, an image registration model, or the like. For example, the training module 440 may obtain a preliminary model. The training module 440 may obtain a plurality of groups of training samples. The plurality of groups of training samples may be used to train the preliminary model. The training module 440 may generate a trained model by training the preliminary model with the plurality of groups of training samples. More descriptions for determining the trained model may be found elsewhere in the present disclosure (e.g., FIG. 11 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the first determination module 420 and the second determination module 430 may be combined into a single module. In some embodiments, one or more modules may be added or omitted in the processing device 120. For example, the processing device 120 may further include a storage module (not shown in FIG. 4) configured to store data and/or information (e.g., at least one image, a segmentation result, feature information of at least one target region, at least one parameter of at least one target region) associated with the medical system 100. As another example, the training module 440 may be omitted.

Figure 5:
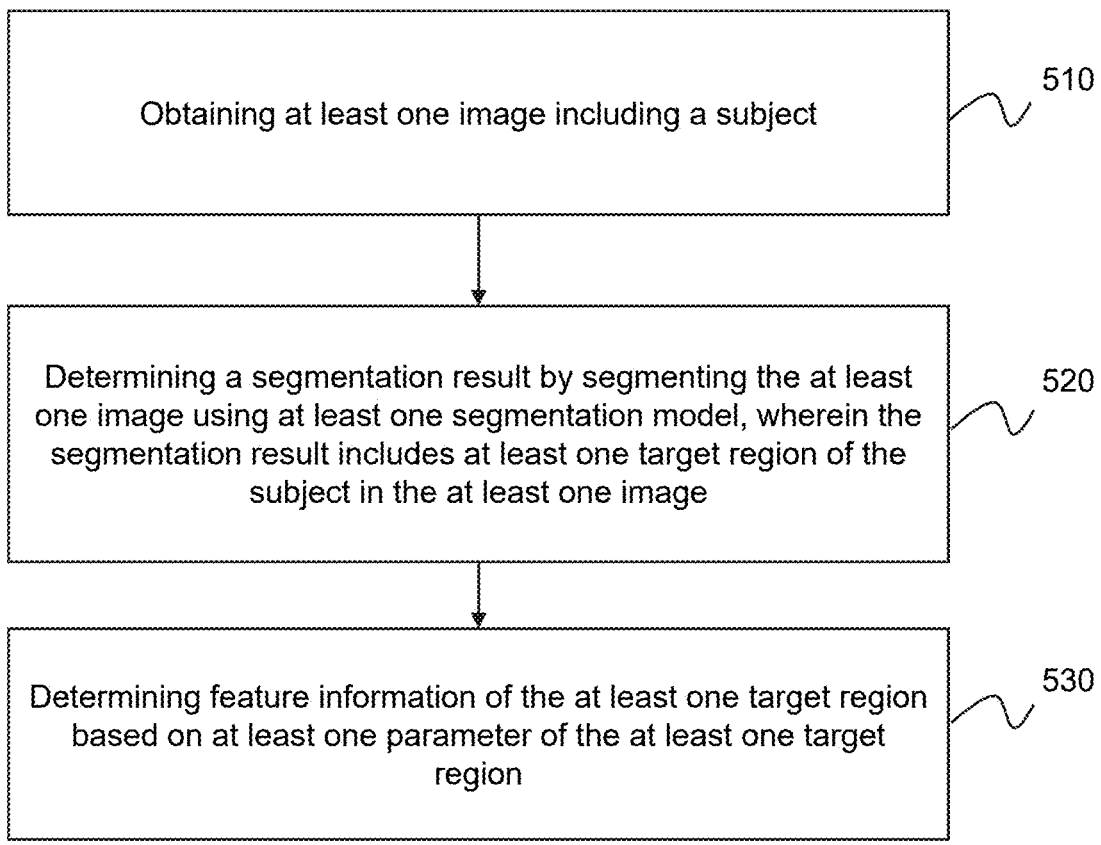
FIG. 5 is a flowchart illustrating an exemplary process for determining feature information of at least one target region of a subject according to some embodiments of the present disclosure.

FIG. 5 is a flowchart illustrating an exemplary process for determining feature information of at least one target region of a subject according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) may obtain at least one image including a subject.

In some embodiments, the subject may be a specific portion (e.g., the head, the thorax, the abdomen), an organ (e.g., a lung, a liver, the heart, the stomach), and/or tissue (e.g., muscle tissue, connective tissue, epithelial tissue, nervous tissue) of a human or an animal. For example, the subject may be a scan region of a patient that need to be scanned by a medical device (e.g., the medical device 110). In some embodiments, the at least one image including the subject may refer to that the at least one image includes a representation of the subject. In the present disclosure, "an image including a representation of a subject" may be referred to as "an image including a subject".

In some embodiments, the at least one image may be a two-dimensional (2D) image, a three-dimensional (3D) image, a four-dimensional (4D) image, or the like. In some embodiments, the at least one image may include a morphological image. The morphological image may include a magnetic resonance imaging (MRI) image, a computed tomography (CT) image, an X-ray image, an ultrasound image, a magnetic resonance spectroscopy (MRS) image, a PET image, a PET-CT image, an MRI-CT image, or the like. In some embodiments, the medical device 110 may obtain scan data (e.g., CT scan data) by scanning (e.g., a CT scanning) the subject. The processing device 120 may generate the at least one image based on the scan data according to one or more reconstruction algorithms (e.g., a filter back projection (FBP) algorithm, a back-projection filter (BFP) algorithm).

In some embodiments, the at least one image may include a functional image (also referred to as a parametric image). The functional image may aid the evaluation of the physiology (functionality) and/or anatomy (structure) of an organ and/or tissue in the subject. In some embodiments, the functional image may include a plurality of elements. As used herein, an element in an image refers to a pixel or a voxel of the image. Each element of the plurality of elements in the functional image may correspond to a physical point of the subject. An element value (e.g., a gray value) of each element of the plurality of elements in the functional image may represent feature information (e.g., values of one or more parameters associated with the feature information) of a corresponding physical point of the subject.

In some embodiments, the functional image may include a diffusion functional image, a perfusion functional image, a fat functional image, a transverse relaxation rate (R2*) image, or the like. The diffusion functional image may reflect a diffusion coefficient corresponding to a region or a point of the subject. The perfusion functional image may reflect a blood flow coefficient or a blood flow velocity coefficient corresponding to a region or a point of the subject. The fat functional image may reflect a fat content or a fat fraction corresponding to a region or a point of liver tissue of the subject. For example, an element value (e.g., a gray value) of each element of the plurality of elements in the fat functional image may reflect a fat signal intensity, a fat signal saturation, or a fat content of a corresponding physical point of the subject. In some embodiments, the fat functional image may include a fat fraction image, a water phase image, a fat phase image, a water-fat in-phase image, a water-fat out-phase image, or the like.

In some embodiments, the processing device 120 may obtain the at least one image from one or more components (e.g., the medical device 110, the terminal 140, the storage device 130) of the medical system 100 or an external storage device via the network 150. For example, the medical device 110 may transmit the at least one image to the storage device 130, or any other storage device for storage. The processing device 120 may obtain the at least one image from the storage device 130, or any other storage device. As another example, the processing device 120 may obtain the at least one image from the medical device 110 directly.

In 520, the processing device 120 (e.g., the first determination module 420) may determine a segmentation result by segmenting the at least one image using at least one segmentation model.

In some embodiments, the segmentation result may include at least one target region of the subject in the at least one image. In the present disclosure, "organ(s) or tissue corresponding to the at least one target region of the subject in the at least one image" may be referred to as "the at least one target region of the subject in the at least one image." For example, the subject may be the heart of a patient, and the at least one target region may include the left atrium, the right atrium, the left ventricle, the right ventricle, or the like, or any combination thereof. As another example, the subject may be liver tissue of a patient, and the at least one target region may include a whole liver, the left lobe of the liver, the right lobe of the liver, a liver segment, a liver lesion region, or the like, or any combination thereof.

In some embodiments, the segmentation result may indicate feature information (e.g., a size, a contour, a position) of the at least one target region of the subject in the at least one image. In some embodiments, the segmentation result may be in a form of a point, a line, a plane, a bounding box, a mask, or the like. For example, the segmentation result may be a bounding box enclosing the at least one target region in the at least one image. As another example, the segmentation result may be one or more feature points (e.g., a center point) of the at least one target region in the at least one image. In some embodiments, texts may be marked on the at least one target region to indicate organ(s) or tissue corresponding to the at least one target region.

In some embodiments, different target regions may be displayed in the at least one image in different colors or different line types (e.g., a dash line, a solid line, a dot line). In some embodiments, the processing device 120 may determine a plurality of segmentation results by segmenting the at least one image using the at least one segmentation model. Each segmentation result may correspond to a target region of a plurality of target regions of the subject in the at least one image. In some embodiments, the processing device 120 may determine a segmentation result by segmenting the at least one image using the at least one segmentation model. The segmentation result may correspond to the plurality of target regions of the subject in the at least one image.

As used herein, a segmentation model refers to an algorithm or process configured to determine a segmentation result based on at least one image. For example, the processing device 120 may input the at least one image including the subject into the segmentation model. The segmentation model may extract image features (e.g., a low-level feature (e.g., an edge feature, a texture feature), a high-level feature (e.g., a semantic feature) of the at least one image, segment the at least one image, and output the segmentation result.

In some embodiments, the segmentation model may be constructed based on a convolutional neural network (CNN), a fully convolutional neural network (FCN), a generative adversarial network (GAN), a U-shape network (U-Net) (e.g., a 3D U-Net), a V-shape network (V-Net), a residual network (ResNet), a dense convolutional network (DenseNet), a deep stacking network, a deep belief network (DBN), a stacked auto-encoders (SAE), a logistic regression (LR) model, a support vector machine (SVM) model, a decision tree model, a naive Bayesian model, a random forest model, a restricted Boltzmann machine (RBM), a gradient boosting decision tree (GBDT) model, a LambdaMART model, an adaptive boosting model, a recurrent neural network (RNN) model, a hidden Markov model, a perceptron neural network model, a Hopfield network model, a visual geometry group (VGG) model, a deeplab model, or the like, or any combination thereof.

In some embodiments, the segmentation model may be determined by training a preliminary model using a plurality of groups of training samples. In some embodiments, the processing device 120 may train the preliminary model to generate the segmentation model according to a machine learning algorithm. The machine learning algorithm may include an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the model may be a supervised learning algorithm, a semi-supervised learning algorithm, an unsupervised learning algorithm, or the like.

In some embodiments, the at least one image may include a morphological image. The segmentation model may be configured to determine the segmentation result based on the morphological image. For example, the processing device 120 may input the morphological image including the subject into the segmentation model. The segmentation model may segment the morphological image, and output the segmentation result (e.g., the at least one target region of the subject in the morphological image). In some embodiments, the segmentation model may be determined by training the preliminary model using the plurality of groups of training samples. Each group of the plurality of groups of training samples may include a sample morphological image of a sample subject, and a first reference segmentation result. The first reference segmentation result may include at least one first reference region of the sample subject in the sample morphological image.

In some embodiments, the at least one image may include a functional image. The segmentation model may be configured to determine the segmentation result based on the functional image. For example, the processing device 120 may input the functional image including the subject into the segmentation model. The segmentation model may segment the functional image, and output the segmentation result (e.g., the at least one target region of the subject in the functional image). In some embodiments, the segmentation model may be determined by training the preliminary model using the plurality of groups of training samples. Each group of the plurality of groups of training samples may include a sample functional image of a sample subject, and a second reference segmentation result. The second reference segmentation result may include at least one second reference region of the sample subject in the sample functional image. More descriptions for training the segmentation model may be found elsewhere in the present disclosure (e.g., FIG. 11, and descriptions thereof).

In some embodiments, the at least one segmentation model may include a first segmentation model and a second segmentation model. The first segmentation model may be configured to determine a preliminary segmentation result by segmenting the at least one image. The second segmentation model may be configured to determine a target segmentation result based on the preliminary segmentation result. More descriptions for the first segmentation model and the second segmentation model may be found elsewhere in the present disclosure (e.g., FIG. 7, and descriptions thereof).

In some embodiments, the subject may be liver tissue of a patient. The at least one segmentation model may include a liver segment recognition model. The processing device 120 may determine a plurality of liver segment regions of the liver tissue based on the at least one image using the liver segment recognition model. The liver segment regions may reflect structural characteristics of the liver. Each liver segment region of the liver may be regarded as a functional anatomical unit of the liver. In some embodiments, the plurality of liver segment region may include the caudate lobe (segment 1), a left lateral lobe (liver segment 2), a lower segment of the left lateral lobe (liver segment 3), a left medial lobe (liver segment 4), a lower segment of the right anterior lobe (liver segment 5), a lower segment of the right posterior segment (liver segment 6), an upper segment of a right posterior lobe (liver segment 7), an upper segment of a right anterior lobe (liver segment 8), or the like, or any combination thereof.

Figure 12:
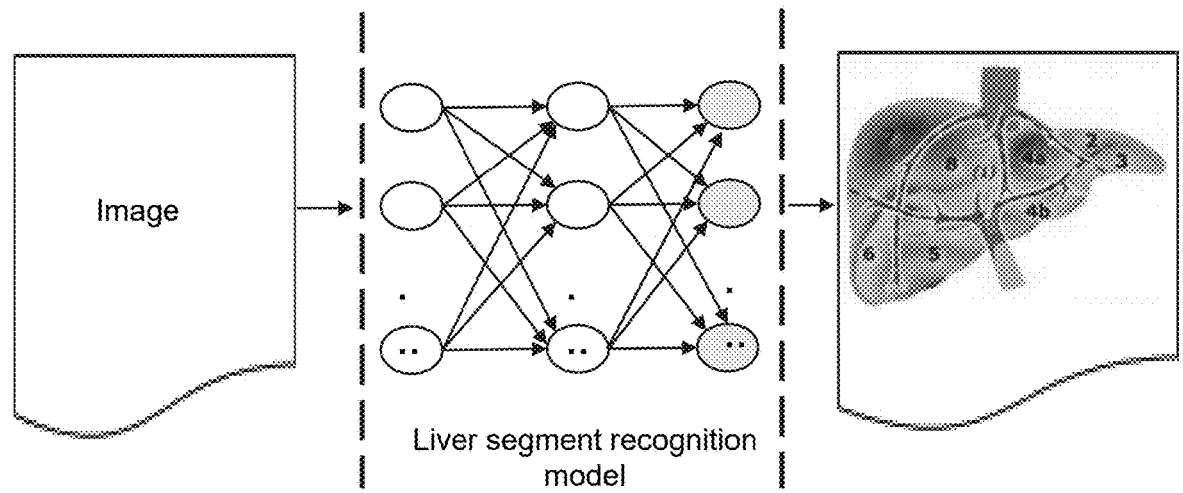
FIG. 12 is a schematic diagram illustrating an exemplary liver segment recognition model according to some embodiments of the present disclosure.

As used herein, a liver segment recognition model refers to an algorithm or process configured to identify at least one liver segment region in an image (e.g., the at least one image) of liver tissue. FIG. 12 is a schematic diagram illustrating an exemplary liver segment recognition model according to some embodiments of the present disclosure. As illustrated in FIG. 12, the processing device 120 may input an image (e.g., the at least one image) into the liver segment recognition model. The liver segment recognition model may identify at least one liver segment region in the at least one image. For example, the liver segment recognition model may determine a bounding box enclosing the at least one liver segment region in the at least one image. As another example, the liver segment recognition model may mark a contour of the at least one liver segment region in the at least one image.

Further, the processing device 120 may determine the at least one target region based on the plurality of liver segment regions. For example, for each liver segment region of the plurality of liver segment regions, the processing device 120 may determine a target region in a center of the liver segment region.

In some embodiments, the subject may be liver tissue of a patient. The processing device 120 may identify a falciform ligament of the liver tissue based on the at least one image using a falciform ligament recognition model. The processing device 120 may determine a left liver region and a right liver region based on the falciform ligament of the liver tissue. The processing device 120 may determine the at least one target region based on the left liver region and the right liver region. More descriptions for determining the at least one target region based on the falciform ligament of the liver tissue using the falciform ligament recognition model may be found elsewhere in the present disclosure (e.g., FIG. 8, and descriptions thereof).

In 530, the processing device 120 (e.g., the second determination module 430) may determine feature information of the at least one target region based on at least one parameter of the at least one target region.

The at least one parameter of the at least one target region may refer to the at least one parameter of organ(s) or tissue of the subject corresponding to a region or a point of the at least one target region in the at least one image. In some embodiments, the at least one parameter of the at least one target region may include a content of a target substance (e.g., an iron content, an oxygen content, a fat content) in the at least one target region, a blood flow parameter (e.g., a blood density, a blood viscosity, a blood flow velocity, a blood flow volume, a blood pressure) of the at least one target region, a dispersion parameter (e.g. a diffusion coefficient, a kurtosis coefficient) of the at least one target region, or the like, or any combination thereof.

The feature information of the at least one target region may refer to the feature information of the organ(s) or tissue of the subject corresponding to the at least one target region in the at least one image. In some embodiments, the processing device 120 may obtain the at least one parameter of the at least one target region. The processing device 120 may determine the feature information of the at least one target region by processing the at least one parameter of the at least one target region. For example, the feature information of the at least one target region may include the maximum value, the minimum value, an average value (e.g., an arithmetic average value, a weighted average value), and/or a variance of a plurality of parameter values corresponding to a plurality of locations in the at least one target region in a preset time period.

Merely by way of example, the processing device 120 may obtain liver fat fractions corresponding to a plurality of target regions of the liver tissue of a patient. The processing device 120 may determine an average value of the liver fat fractions corresponding to the plurality of target regions as a liver fat fraction corresponding to the liver tissue of the patient. As another example, the processing device 120 may determine an average value of element values of a plurality of elements in at least one target region of a fat fraction image of the subject as a fat fraction corresponding to the subject.

may be in a form of a table, a text, a picture, a chart, or the like, or any combination thereof. Merely by way of example, the report of the feature information of the at least one target region of liver tissue of a patient may be shown as Table 1.

TABLE 1

A report of feature information of target regions of liver tissue

| Item | Fat fraction | | | | Diffusion coefficient | | | |
| --- | --- | --- | --- | --- | --- | --- | --- | --- |
| | Average Value | Maximum Value | Minimum Value | Variance | Average Vale | Maximum Value | Minimum Value | Variance |
| liver tissue A | | | | | | | | |
| liver tissue B | | | | | | | | |
| liver tissue C | | | | | | | | |
| ... | | | | | | | | |
| Average | | | | | | | | |

In some embodiments, the at least one image may include a morphological image. The processing device 120 may obtain a functional image corresponding to the morphological image. The processing device 120 may determine at least one second target region in the functional image corresponding to the at least one target region in the morphological image by registering the functional image and the morphological image. The processing device 120 may designate at least one parameter of the at least one second target region in the functional image as the at least one parameter of the at least one target region in the morphological image. The processing device 120 may determine the feature information of the at least one target region based on the at least one parameter of the at least one target region. More descriptions for determine the feature information of the at least one target region in the morphological image may be found elsewhere in the present disclosure (e.g., FIG. 6, and descriptions thereof).

In some embodiments, the at least one image may include a functional image. The processing device 120 may obtain the at least one parameter of the at least one target region in the functional image. For example, an element value (e.g., a gray value) of each element of a plurality of elements in the functional image may reflect parameter value(s) of a corresponding physical point of the subject as described in connection with operation 510. The processing device 120 may determine the at least one parameter of the at least one target region in the functional image based on the element values of elements in the at least one target region in the functional image. The processing device 120 may determine the feature information of the at least one target region based on the at least one parameter of the at least one target region. Accordingly, since the functional image reflects parameter value(s) corresponding to a region or a point of the subject, the feature information of the at least one target region may be determined based on the functional image directly, which may improve the efficiency of the determination of the at least one parameter of the at least one target region and the determination of the feature information of the at least one target region.

In some embodiments, the processing device 120 may generate a report based on the feature information of the at least one target region. In some embodiments, the report According to some embodiments of the present disclosure, the segmentation result (e.g., the at least one target region) may be determined by segmenting the at least one image using the at least one segmentation model, and the feature information of the at least one target region may be determined based on the at least one parameter of the at least one target region. Therefore, the methods and systems disclosed herein can improve the accuracy and efficiency of the image segmentation by, e.g., reducing the workload of a user, cross-user variations, and the time needed for the image segmentation. The accuracy and credibility of the feature information of the at least one target region determined based on the segmentation result may also be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added in process 500. For example, process 500 may include an additional operation for transmitting the at least one image, the segmentation result, and/or the report to a terminal device (e.g., the terminal 140) for display. In some embodiments, the processing device 120 may input raw data (e.g., projection data) into the segmentation model, and the segmentation model may generate the at least one image based on the raw data, and output the segmentation result.

In some embodiments, the processing device 120 may perform a preprocessing operation (e.g., a denoising operation, an image enhancement operation (e.g., a contrast enhancement operation), a filtering operation, an edge detection operation, an image sharpening operation) on the at least one image. For example, the processing device 120 may perform the image sharpening operation on the at least one image to generate a processed image. By performing the image sharpening operation on the at least one image, the contrast between blood vessels (e.g., a portal vein, a hepatic artery, a hepatic vein, a hepatic bile duct and its bifurcated vessel wall) and surrounding organs or tissue in the at least one image may be increased, which may improve the accuracy and efficiency of the image segmentation. Further, the processing device 120 may input the processed image into the at least one segmentation model (e.g., the liver segment recognition model).

In some embodiments, at least one of the preprocessing operations may be incorporated into the segmentation model. For instance, the segmentation model may be configured to perform one or more of: (1) assess the contrast of the at least one image and determine whether to perform the contrast enhancement operation and/or the image sharpening operation based on benefit(s) that may be obtained by performing the contrast enhancement operation and/or the contrast enhancement operation, (2) assess the noises of the at least one image, and determine whether to perform the denoising operation and/or the filtering operation based on benefit(s) that may be obtained by performing the denoising operation and/or the filtering operation.

In some embodiments, the processing device 120 may determine/adjust an image acquisition mode of the at least one image to improve the image resolution of the at least one image and/or reduce the image acquisition time of the at least one image. For example, during the acquisition of the at least one image (e.g., an MRI image), the magnetic field strength may be increased, a multi-echo steady-state mode may be applied, and/or an efficient k-space filling mode (e.g., a spiral sampling trajectory, a radial sampling trajectory) may be applied. In some embodiments, the at least one segmentation model may include a channel attention module, a deep supervision module, and/or a contrastive learning module, which may improve the recognition ability of the segmentation model to the boundary of an organ or tissue of a patient. Therefore, the accuracy and efficiency of the image segmentation using the at least one segmentation model may be improved.

Figure 6:
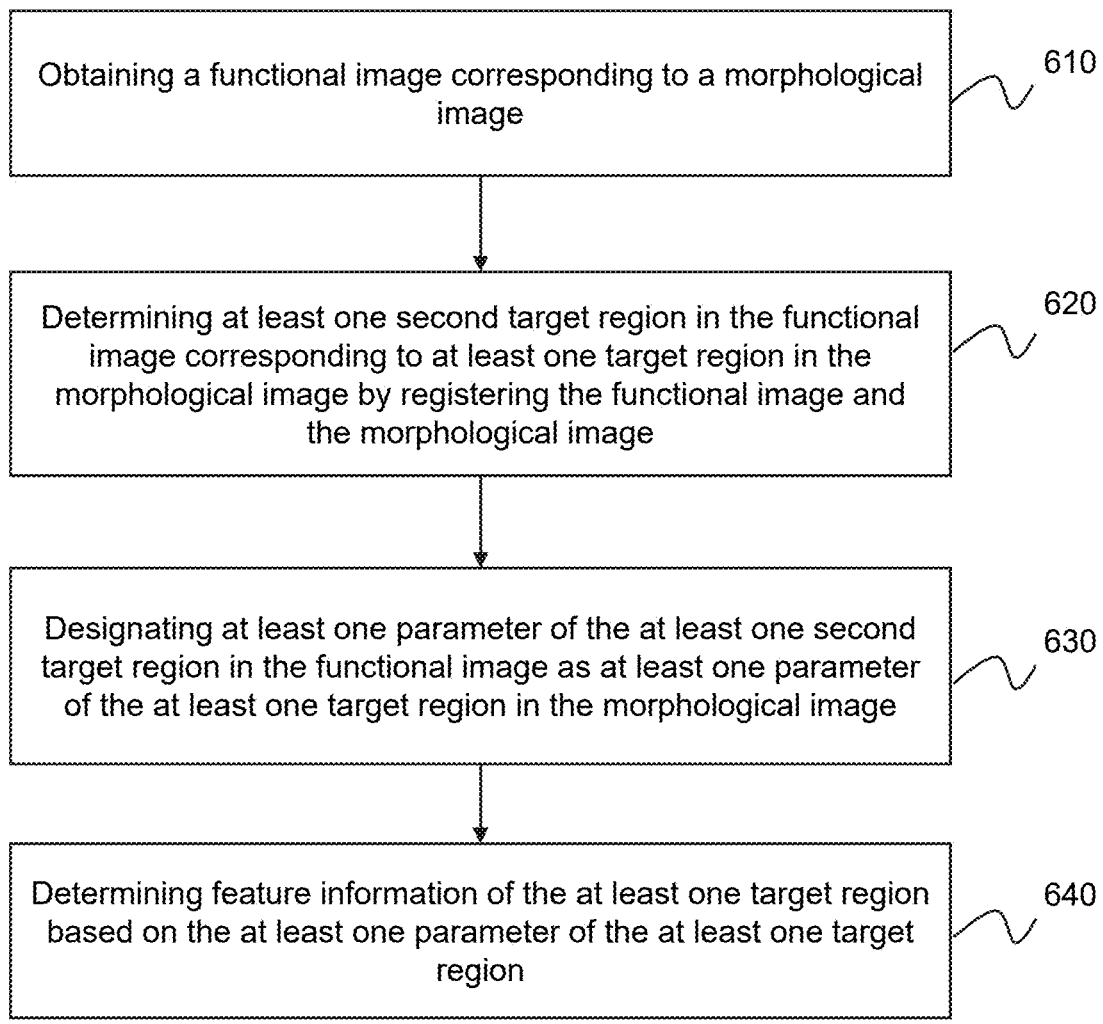
FIG. 6 is a flowchart illustrating an exemplary process for determining feature information of at least one target region of a subject according to some embodiments of the present disclosure.

FIG. 6 is a flowchart illustrating an exemplary process for determining feature information of at least one target region of a subject according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 120 (e.g., the second determination module 430) may obtain a functional image corresponding to a morphological image.

In some embodiments, the at least one image obtained in operation 510 may include the morphological image of the subject. The processing device 120 may obtain the functional image corresponding to the morphological image. The morphological image and the corresponding functional image may correspond to a same subject. For example, a medical device (e.g., the medical device 110) may acquire the morphological image and the corresponding functional image of the subject by scanning the subject. As another example, the morphological image and the corresponding functional image of the subject may be generated by scanning the subject using two medical devices, respectively. A correspondence relationship between the morphological image and the functional image may be stored in the storage device 130, or any other storage device. The processing device 120 may obtain the functional image corresponding to the morphological image based on the morphological image obtained in operation 510 and the correspondence relationship between the morphological image and the functional image.

In 620, the processing device 120 (e.g., the second determination module 430) may determine at least one second target region in the functional image corresponding to at least one target region in the morphological image by registering the functional image and the morphological image.

In some embodiments, the processing device 120 may determine a deformation field by registering the functional image and the morphological image according to one or more registration algorithms. The registration algorithms may include a radial basis function (e.g., a thin-plate or surface splines transformation, a multiquadric transformation, a compactly-supported transformation), a physical continuum model, a large deformation model (e.g., diffeomorphisms), or the like, or any combination thereof. In some embodiments, the processing device 120 may determine a deformation field by registering the functional image and the morphological image according to an image registration model. As used herein, an image registration model refers to an algorithm or process configured to perform an image registration operation on two images (e.g., the functional image and the morphological image) to generate a registration result (e.g., a deformation field).

In some embodiments, the image registration model may be constructed based on a convolutional neural network (CNN), a fully convolutional neural network (FCN), a generative adversarial network (GAN), a U-shape network (U-Net) (e.g., a 3D U-Net), a V-shape network (V-Net), a residual network (ResNet), a dense convolutional network (DenseNet), a deep stacking network, a deep belief network (DBN), a stacked auto-encoders (SAE), a logistic regression (LR) model, a support vector machine (SVM) model, a decision tree model, a naive Bayesian model, a random forest model, a restricted Boltzmann machine (RBM), a gradient boosting decision tree (GBDT) model, a LambdaMART model, an adaptive boosting model, a recurrent neural network (RNN) model, a hidden Markov model, a perceptron neural network model, a Hopfield network model, a visual geometry group (VGG) model, a deeplab model, or the like, or any combination thereof.

The deformation field may represent a mapping relationship between a plurality of elements in the morphological image and a plurality of elements in the functional image. In some embodiments, the deformation field may include a plurality of vectors each of which corresponds to an element in the morphological image. Take a specific vector as an example, a direction of the vector represents a direction in which a corresponding element in the morphological image shall move in order to reach a position of a corresponding element in the functional image; a magnitude of the vector represents a distance that the element in the morphological image shall travel in the corresponding direction in order to reach the position of the corresponding element in the functional image.

Further, the processing device 120 may determine the at least one second target region in the functional image corresponding to at least one target region in the morphological image based on the deformation field. For example, the processing device 120 may obtain image coordinates of elements in the at least one target region in the morphological image. The processing device 120 may determine image coordinates of elements in the at least one second target region in the functional image by transforming the image coordinates of the elements in the at least one target region in the morphological image based on the deformation field.

In 630, the processing device 120 (e.g., the second determination module 430) may designate at least one parameter of the at least one second target region in the functional image as at least one parameter of the at least one target region in the morphological image.

In some embodiments, the processing device 120 may obtain the at least one parameter of the at least one second target region in the functional image based on element values of elements in the at least one second target region in the functional image. The processing device 120 may designate the at least one parameter of the at least one second target region in the functional image as the at least one parameter of the at least one target region in the morphological image.

In 640, the processing device 120 (e.g., the second determination module 430) may determine feature information of the at least one target region based on the at least one parameter of the at least one target region.

Operation 640 may be performed in a similar manner as operation 530 as described in connection with FIG. 5, the descriptions of which are not repeated here.

Accordingly, since the morphological image shows a boundary of an organ or tissue of a patient clearly, the accuracy of the segmentation result (e.g., the at least one target region) determined by segmenting the morphological image using the at least one segmentation model may be improved. The accuracy and credibility of the feature information of the at least one target region determined based on the segmentation result may also be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
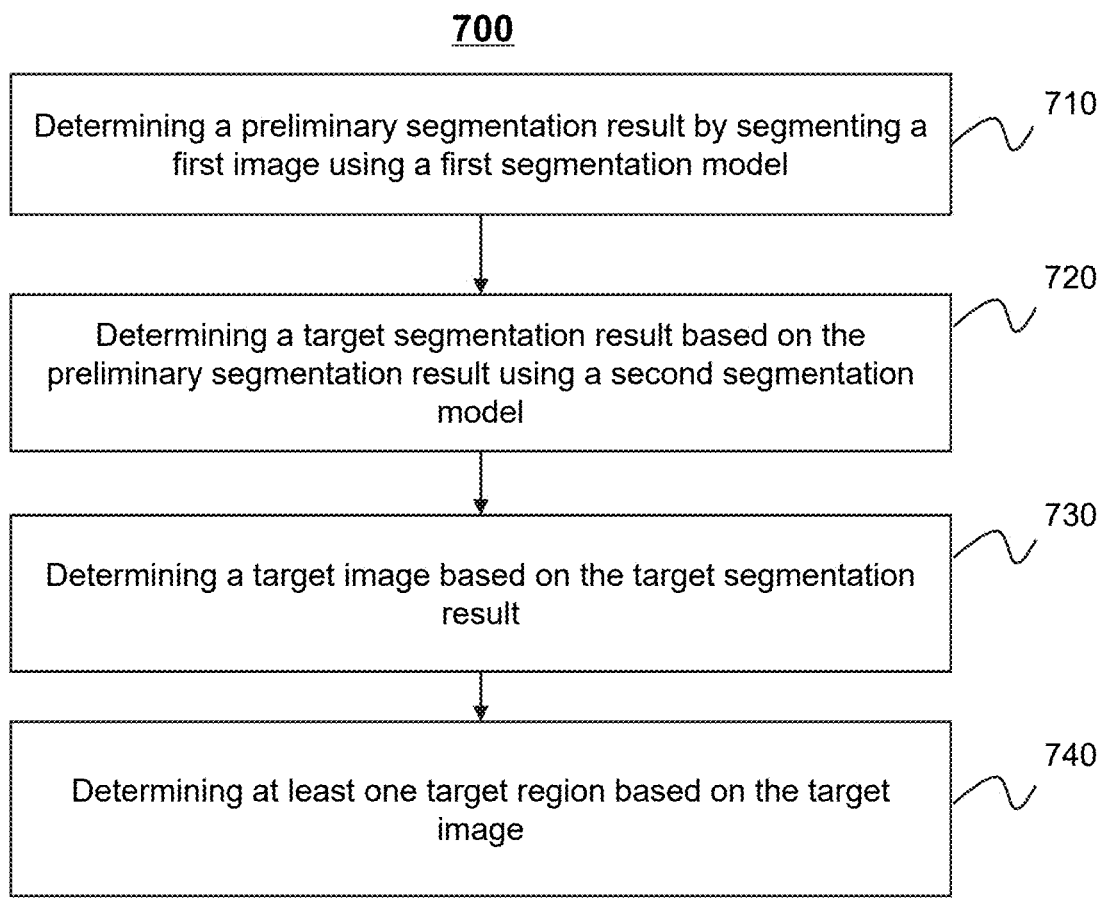
FIG. 7 is a flowchart illustrating an exemplary process for determining at least one target region of a subject according to some embodiments of the present disclosure.

FIG. 7 is a flowchart illustrating an exemplary process for determining at least one target region of a subject according to some embodiments of the present disclosure. In some embodiments, process 700 may be executed by the medical system 100. For example, the process 700 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting.

In 710, the processing device 120 (e.g., the first determination module 420) may determine a preliminary segmentation result by segmenting a first image using a first segmentation model.

In some embodiments, the at least one image obtained in operation 510 may include the first image. The first image may be a 2D image, a 3D image, a 4D image, or the like. The first image may be a morphological image, a functional image, or the like.

In some embodiments, the processing device 120 may determine the preliminary segmentation result by performing a preliminary segmentation operation on the first image. For example, the preliminary segmentation result may include a preliminary region representative of the subject which is roughly or coarsely segmented from the first image. For example, the preliminary region may be represented by a bounding box enclosing the subject. The bounding box may have a shape of a square, a rectangle, a triangle, a polygon, a circle, an ellipse, an irregular shape, or the like.

In some embodiments, the subject may be liver tissue of a patient. The preliminary segmentation operation may refer to a process of distinguishing (e.g., segmenting, dividing) a portion of the first image including a representation of the whole liver from a portion of the first image including a representation of organs and tissues that surrounds or in a vicinity of the whole liver.

In some embodiments, the preliminary segmentation result may be an image (e.g., a 3D image) including a plurality of elements. A value of each element of the plurality of elements of the image may represent a probability that the element belongs to the portion of the first image including the representation of the whole liver. For example, if a value of an element is relatively large (e.g., the value of the element is 1 or close to 1), it may indicate that the probability that the element belongs to the portion of the first image including the representation of the whole liver is relatively large. If a value of an element is relatively small (e.g., the value of the element is 0 or close to 0), it may indicate that the probability that the element belongs to the portion of the first image including the representation of the whole liver is relatively small.

As used herein, a first segmentation model refers to an algorithm or process configured to perform a preliminary segmentation operation on an image (e.g., the first image) to generate a preliminary segmentation result. For example, the processing device 120 may input the first image into the first segmentation model. The first segmentation model may output the preliminary segmentation result.

In 720, the processing device 120 (e.g., the first determination module 420) may determine a target segmentation result based on the preliminary segmentation result using a second segmentation model.

In some embodiments, the processing device 120 may determine the target segmentation result by performing a target segmentation operation on the preliminary segmentation result. For example, the target segmentation result may include a candidate region representative of the subject refined from the preliminary region. Merely by way of example, the subject may be liver tissue of a patient. The preliminary region may be represented by a rectangular bounding box enclosing the whole liver of the patient, and the candidate region may be a region representative of an effective liver region within the rectangular bounding box. The effective liver region may refer to a region of the whole liver that excludes an ineffective liver region (e.g., a liver lesion region, a volume effect region). The liver lesion region may include a cyst region, a tumor region, a sclerotic region, an intrahepatic bile duct stone region, a fibrosis region, an inflammatory region, or the like. The volume effect region may refer to that a portion of a region belongs to the liver tissue and the other portion of the region belongs to adjacent organs or tissues of the patient. For example, a portion of an element (or a region) corresponding to the junction of the liver and the diaphragm in the first image may belong to the liver, and the other portion of the element (or the region) may belong to the diaphragm.

In some embodiments, the subject may be the liver tissue of the patient. The target segmentation operation may refer to a process of removing the ineffective liver region from the whole liver to generate the effective liver region. For example, element values of elements corresponding to the ineffective liver region in the preliminary segmentation result may be set as default values (e.g., 255), to determine the target segmentation result.

As used herein, a second segmentation model refers to an algorithm or process configured to perform a target segmentation operation on an image (e.g., the preliminary segmentation result) to generate a target segmentation result. In some embodiments, the processing device 120 may input the preliminary segmentation result into the second segmentation model. The second segmentation model may generate the target segmentation result by segmenting the preliminary segmentation result, and output the target segmentation result. In some embodiments, the processing device 120 may input a second image and the preliminary segmentation result into the second segmentation model. The second image and the first image may be different types of images corresponding to a same subject. For example, the first image may be a fat fraction image of the subject, and the second image may be a water phase image, a fat phase image, a water-fat in-phase image, or a water-fat out-phase image of the subject. The second segmentation model may process (e.g., segment) the second image based on the preliminary segmentation result to generate a processed second image. For example, element values of elements of the second image corresponding to regions other than a whole liver region may be set as 0, to generate the processed second image. The second segmentation model may generate the target segmentation result by segmenting the processed second image, and output the target segmentation result.

In some embodiments, the processing device 120 may process the second image based on the preliminary segmentation result to generate the processed second image. The processing device 120 may input the processed second image into the second segmentation model. The second segmentation model may generate the target segmentation result by segmenting the processed second image, and output the target segmentation result.

In 730, the processing device 120 (e.g., the first determination module 420) may determine a target image based on the target segmentation result.

In some embodiments, the target segmentation result may be a 3D image including a plurality of slices of the subject. The plurality of slices may correspond to a transverse plane, a coronal plane, or a sagittal plane of the subject. The processing device 120 may select at least one slice from the plurality of slices of the 3D image as the target image. More descriptions for determining the target image may be found elsewhere in the present disclosure (e.g., FIG. 8, and descriptions thereof).

In some embodiments, the processing device 120 may determine a plurality of liver segment regions of the liver tissue based on the target segmentation result using the liver segment recognition model as described in connection with operation 530. For example, the processing device 120 may input the target segmentation result into the liver segment recognition model. The liver segment recognition model may identify a plurality of liver segment regions in the target segmentation result. The processing device 120 may select at least one liver segment region from the plurality of liver segment regions of the liver tissue as the target image.

In some embodiments, the processing device 120 may identify a vascular region and/or a boundary region in the target segmentation result. The processing device 120 may determine the target image by removing the vascular region and/or the boundary region from the target segmentation result. In some embodiments, the subject is liver tissue of a patient, and the vascular region may include a right hepatic vein, a middle hepatic vein, a left hepatic vein, an umbilical vein, an inferior vena cava, a hepatic artery, a portal vein, a hepatic duct, a common bile duct and branches of blood vessels, or the like, or any combination thereof. The boundary region of an image may refer to the outermost region of the image.

In some embodiments, the processing device 120 may remove the vascular region from the target segmentation result by performing a multiscale vessel enhancement filtering operation on the target segmentation result. In some embodiments, the processing device 120 may identify the vascular region in the target segmentation result using a vascular recognition model. As used herein, a vascular recognition model refers to an algorithm or process configured to identify (or remove) a vascular region in an image (e.g., the target segmentation result). For example, the processing device 120 may input the target segmentation result into the vascular recognition model. The vascular recognition model may identify (or remove) the vascular region in the target segmentation result. For example, the vascular recognition model may set element values of elements in the vascular region of the target segmentation result as default values (e.g., 255).

In some embodiments, the vascular recognition model may be constructed based on a convolutional neural network (CNN), a fully convolutional neural network (FCN), a generative adversarial network (GAN), a U-shape network (U-Net) (e.g., a 3D U-Net), a V-shape network (V-Net), a residual network (ResNet), a dense convolutional network (DenseNet), a deep stacking network, a deep belief network (DBN), a stacked auto-encoders (SAE), a logistic regression (LR) model, a support vector machine (SVM) model, a decision tree model, a naive Bayesian model, a random forest model, a restricted Boltzmann machine (RBM), a gradient boosting decision tree (GBDT) model, a LambdaMART model, an adaptive boosting model, a recurrent neural network (RNN) model, a hidden Markov model, a perceptron neural network model, a Hopfield network model, a visual geometry group (VGG) model, a deeplab model, or the like, or any combination thereof.

In some embodiments, the processing device 120 may remove the boundary region from the target segmentation result by performing an edge corrosion operation on the target segmentation result. In some embodiments, the processing device 120 may remove the boundary region from the target segmentation result by setting element values of elements in the boundary region of the target segmentation result (e.g., an image) as default values (e.g., 255).

In 740, the processing device 120 (e.g., the first determination module 420) may determine at least one target region based on the target image.

In some embodiments, the processing device 120 may divide the target image into a plurality of sub-regions. The sub-regions may be of any size or shape. The shapes and/or sizes of different sub-regions may be the same or different. In some embodiments, the processing device 120 may divide the target image into a plurality of sub-regions with the same size and/or shape. For example, the processing device 120 may uniformly divide the target image into a plurality of sub-regions having a polygonal shape, such as a regular triangle, a rectangle, a square, or a regular hexagon. The processing device 120 may then determine at least one ROI in each of the plurality of sub-regions based on a count of ROIs and a size of an ROI. The count of ROIs, the size of an ROI, and the shape of the ROI may be set manually or be determined by one or more components (e.g., the processing device 120) of the medical system 100 according to different situations. For example, for each sub-region of the plurality of sub-regions, the processing device 120 may set an ROI in a central portion of the sub-region. As another example, for each sub-region of the plurality of sub-regions, the processing device 120 may determine a plurality of candidate ROIs in the sub-region. The processing device 120 may select at least one candidate ROI from the plurality of candidate ROIs in the sub-region as the at least one ROI in the sub-region. For illustration purposes, for each candidate ROI of the plurality of candidate ROIs in the sub-region, the processing device 120 may determine a variance of element values of elements in the candidate ROI. The processing device 120 may select a candidate ROI with the smallest variance as the ROI in the sub-region. Further, the processing device 120 may determine the at least one target region based on a plurality of ROIs in the plurality of sub-regions. For example, the processing device 120 may select at least one ROI from a plurality of ROIs in the plurality of sub-regions as the at least one target region.

According to some embodiments of the present disclosure, the preliminary segmentation result (e.g., a whole liver region) may be determined by segmenting the first image using the first segmentation model, which may avoid the interference of non-liver regions in the subsequent image segmentation process, reduce the workload of sample annotation in the training process of the second segmentation model, and improve the accuracy of subsequent image segmentation process. The target segmentation result (e.g., an effective liver region) may then be determined based on the preliminary segmentation result using the second segmentation model. The target image may be determined based on the target segmentation result. Due to the large volume of the liver tissue and the uneven distribution of fat, iron, and other elements in the liver tissue, the at least one target regions may be determined on the target image, and feature information (e.g., an iron content, a fat content) of the at least one target regions may be determined, which may improve the accuracy of local analysis of the liver tissue. By setting the at least one target region in the target segmentation result, it may avoid the overlap between the at least one target region and the ineffective liver region, which may improve the accuracy of quantitative analysis of the liver tissue.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
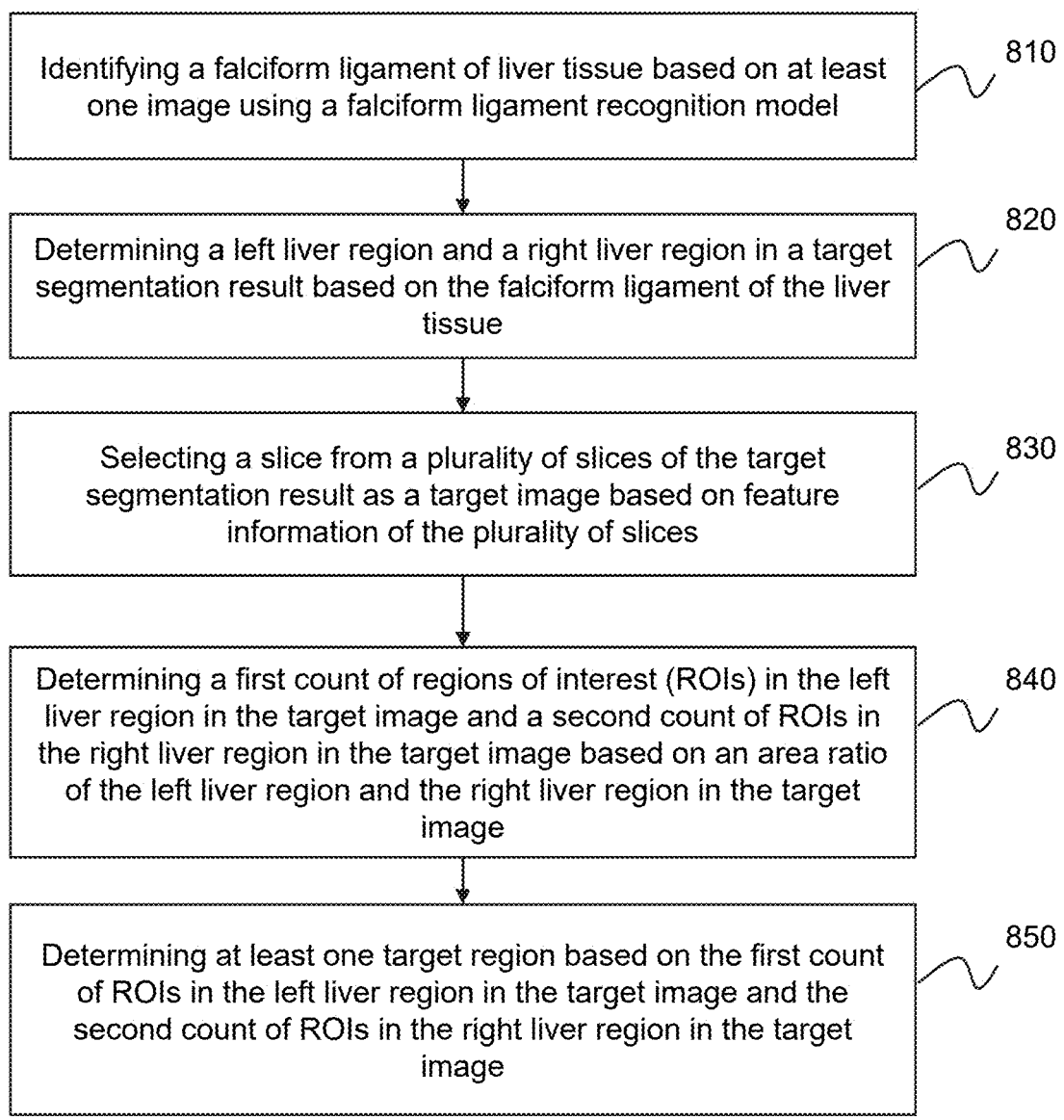
FIG. 8 is a flowchart illustrating an exemplary process for determining at least one target region of a subject according to some embodiments of the present disclosure.

FIG. 8 is a flowchart illustrating an exemplary process for determining at least one target region of a subject according to some embodiments of the present disclosure. In some embodiments, process 800 may be executed by the medical system 100. For example, the process 800 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 120 (e.g., the first determination module 420) may identify a falciform ligament of liver tissue based on at least one image using a falciform ligament recognition model.

In some embodiments, the subject may be liver tissue of a patient. The falciform ligament may be a thin, sickle-shaped, fibrous structure that connects the anterior part of the liver tissue to the ventral wall of the abdomen. The liver tissue may be divided by the falciform ligament into a right lobe and a left lobe.

Figure 13:
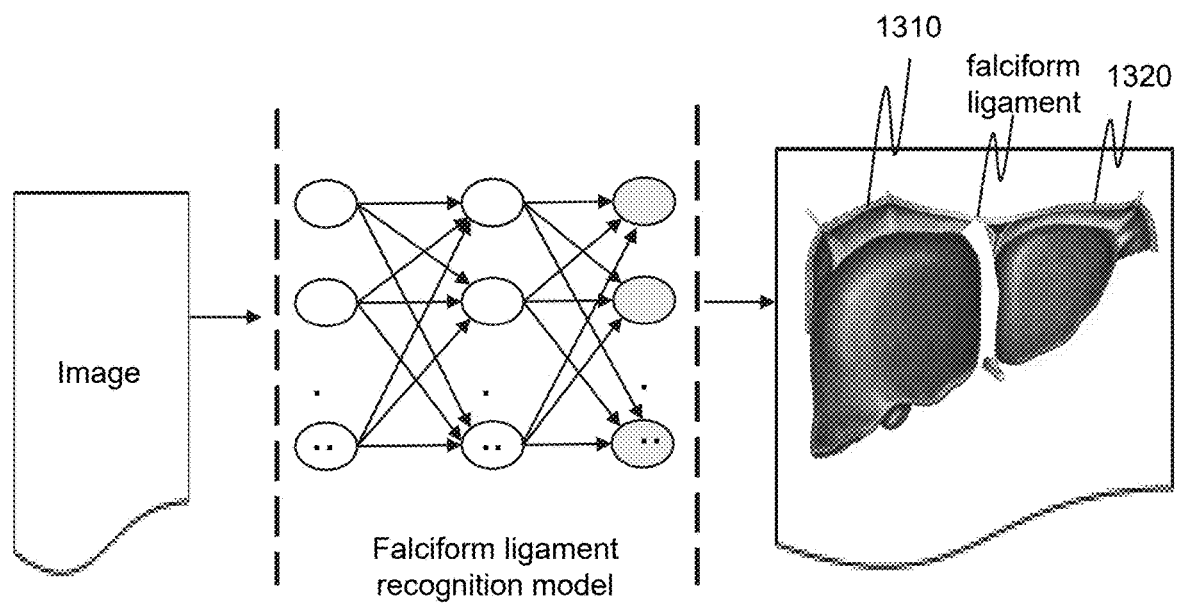
FIG. 13 is a schematic diagram illustrating an exemplary falciform ligament recognition model according to some embodiments of the present disclosure.

As used herein, a falciform ligament recognition model refers to an algorithm or process configured to identify a falciform ligament of liver tissue in an image (e.g., the at least one image, the preliminary segmentation result, the target segmentation result). FIG. 13 is a schematic diagram illustrating an exemplary falciform ligament recognition model according to some embodiments of the present disclosure. As illustrated in FIG. 13, the processing device 120 may input an image (e.g., the preliminary segmentation result, the target segmentation result) into the falciform ligament recognition model. The falciform ligament recognition model may identify the falciform ligament of the liver tissue in the image (e.g., the preliminary segmentation result, the target segmentation result). For example, the falciform ligament recognition model may mark a contour of the falciform ligament of the liver tissue in the image. As another example, the falciform ligament recognition model may set element values of elements in the falciform ligament of the liver tissue in the image as default values (e.g., 255).

In some embodiments, the falciform ligament recognition model may be constructed based on a convolutional neural network (CNN), a fully convolutional neural network (FCN), a generative adversarial network (GAN), a U-shape network (U-Net) (e.g., a 3D U-Net), a V-shape network (V-Net), a residual network (ResNet), a dense convolutional network (DenseNet), a deep stacking network, a deep belief network (DBN), a stacked auto-encoders (SAE), a logistic regression (LR) model, a support vector machine (SVM) model, a decision tree model, a naive Bayesian model, a random forest model, a restricted Boltzmann machine (RBM), a gradient boosting decision tree (GBDT) model, a LambdaMART model, an adaptive boosting model, a recurrent neural network (RNN) model, a hidden Markov model, a perceptron neural network model, a Hopfield network model, a visual geometry group (VGG) model, a deeplab model, or the like, or any combination thereof.

In 820, the processing device 120 (e.g., the first determination module 420) may determine a left liver region and a right liver region in a target segmentation result based on the falciform ligament of the liver tissue.

In some embodiments, the falciform ligament of the liver tissue may divide the target segmentation result into a first region and a second region. The processing device 120 may determine the first region (or the second region) as the left liver region, and the second region (or the first region) as the right liver region. For example, as illustrated in FIG. 13, the processing device 120 may determine a left liver region 1310 and a right liver region 1320 based on the falciform ligament of the liver tissue.

In 830, the processing device 120 (e.g., the first determination module 420) may select a slice from a plurality of slices of the target segmentation result as a target image based on feature information of the plurality of slices.

In some embodiments, the target segmentation result may be a 3D image including a plurality of slices of the subject. The processing device 120 may select the slice from the plurality of slices of the target segmentation result as the target image based on the feature information of the plurality of slices. The feature information of the slice may include a size of the slice, a location of the slice, a liver area in the slice, or the like, or any combination thereof. For example, the processing device 120 may select a slice with the largest size from the plurality of slices of the target segmentation result as the target image. As another example, the processing device 120 may select a slice with the largest liver area from the plurality of slices of the target segmentation result as the target image. As still another example, the processing device 120 may select a slice in a middle location of the plurality of slices of the target segmentation result as the target image. As still another example, the processing device 120 may select a slice located at the golden section position of the liver tissue from the plurality of slices of the target segmentation result as the target image.

In 840, the processing device 120 (e.g., the first determination module 420) may determine a first count of regions of interest (ROIs) in the left liver region in the target image and a second count of ROIs in the right liver region in the target image based on an area ratio of the left liver region and the right liver region in the target image.

In some embodiments, the processing device 120 may determine the first count of ROIs in the left liver region in the target image and the second count of ROIs in the right liver region in the target image based on the area ratio of the left liver region and the right liver region in the target image and a total number of the ROIs. The total number of the ROIs may be set manually or be determined by one or more components (e.g., the processing device 120) of the medical system 100 according to different situations. For example, the total number of the ROIs may be determined based on user experience, an area of the liver tissue, a size of the ROI, a shape of the ROI, a parameter (e.g., a spatial resolution, a contrast resolution) of the medical device, or the like, or any combination thereof.

For illustration purposes, if the area ratio of the left liver region and the right liver region in the target image is 1:3, and the total number of the ROIs are 20, the processing device 120 may determine that the first count of ROIs in the left liver region in the target image is 5, and the second count of ROIs in the right liver region in the target image is 15.

Figure 9:
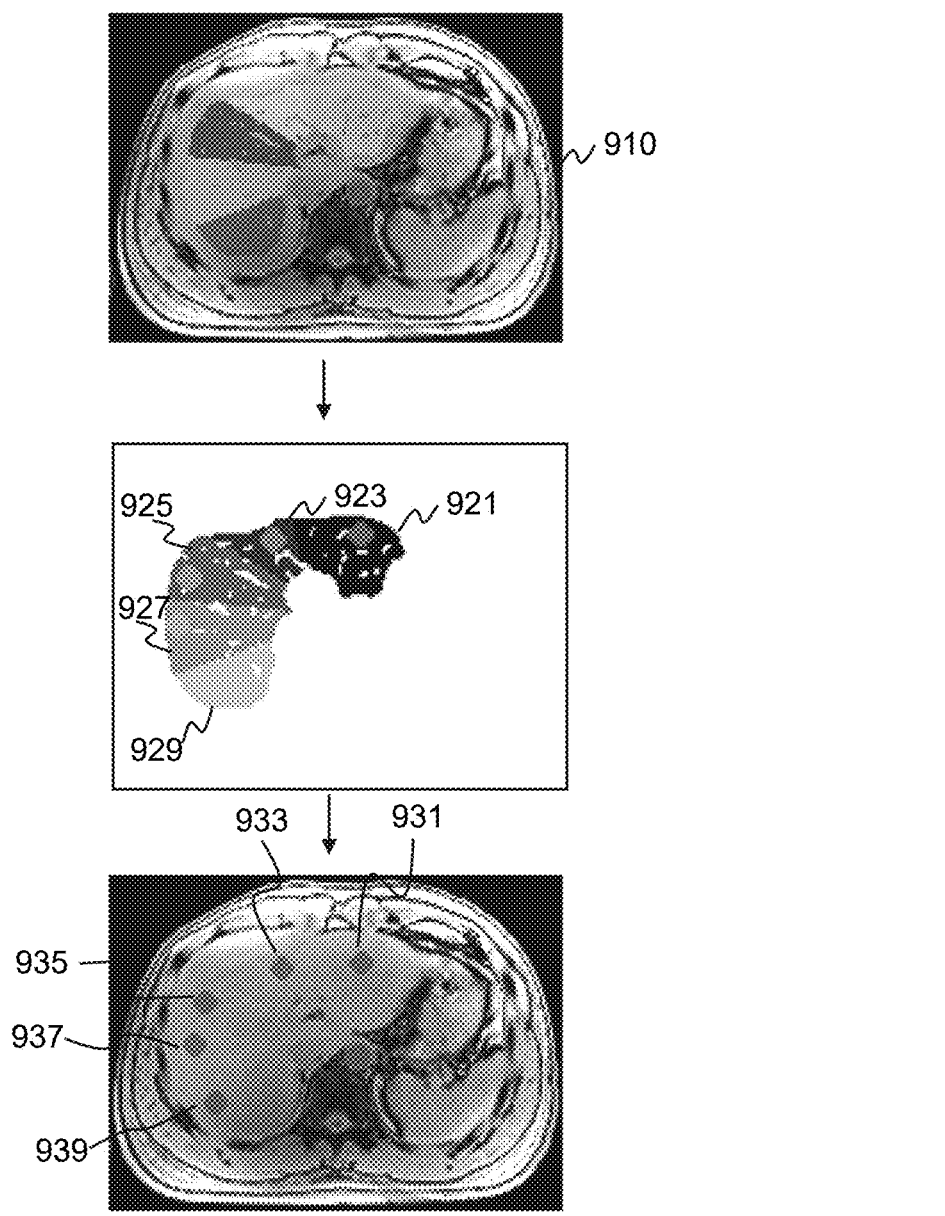
FIG. 9 is a schematic diagram illustrating an exemplary process for determining ROIs in a target image according to some embodiments of the present disclosure.

In some embodiments, the processing device 120 may divide the left liver region in the target image into a plurality of first regions. The processing device 120 may divide the right liver region in the target image into a plurality of second regions. The first regions (or the second regions) may be of any size or shape. The shapes and/or sizes of different first regions (or the second regions) may be the same or different. The processing device 120 may divide the left liver region (or the right liver region) in the target image into the plurality of first regions (or the plurality of second regions) according to an area division manner, an angle division manner, and/or user experience. For example, the processing device 120 may divide the left liver region into the first count (e.g., 5) of first regions with the same size. The processing device 120 may divide the right liver region into the second count (e.g., 15) of second regions with the same size. As another example, as illustrated in FIG. 9, the processing device 120 may divide the left liver region (or the right liver region) into a plurality of first regions (or a plurality of second regions) (e.g., a region 921, a region 923, a region 925, a region 927, a region 929) with the same dividing angle.

The processing device 120 may determine at least one ROI in each of the plurality of first regions and the plurality of second regions. The ROI may be of any size or shape. For example, the ROI may have a polygonal shape (e.g., a regular triangle, a rectangle, a square, a diamond, or a regular hexagon), a sector shape, a circular shape. The size of the ROI may be determined based on an area of liver tissue, an area of the left liver region, an area of the right liver region, a shape of the left liver region, a shape of the right liver region, the total number of the ROIs, or the like, or any combination thereof. For example, for each of the plurality of first regions and the plurality of second regions, the processing device 120 may set an ROI in a central portion of the first region (or the second region). As another example, for each of the plurality of first regions and the plurality of second regions, the processing device 120 may determine a plurality of candidate ROIs in the first region (or the second region). The processing device 120 may select at least one candidate ROI from the plurality of candidate ROIs in the first region (or the second region) as the at least one ROI in the first region (or the second region). For illustration purposes, for each candidate ROI of the plurality of candidate ROIs in the first region (or the second region), the processing device 120 may determine a variance of element values of elements in the candidate ROI. The processing device 120 may select a candidate ROI with the smallest variance as the ROI in the first region (or the second region).

In 850, the processing device 120 (e.g., the first determination module 420) may determine at least one target region based on the first count of ROIs in the left liver region in the target image and the second count of ROIs in the right liver region in the target image.

In some embodiments, the processing device 120 may select at least one ROI from the first count of ROIs in the left liver region in the target image and the second count of ROIs in the right liver region in the target image as the at least one target region. For example, the processing device 120 may determine all the ROIs in the left liver region and the right liver region in the target image as target regions. As another example, the processing device 120 may select the at least one ROI from the first count of ROIs in the left liver region in the target image and the second count of ROIs in the right liver region in the target image according to user experience.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 120 may select a plurality of slices from the target segmentation result as a plurality of target images. The processing device 120 may determine a plurality of ROIs in each of the plurality of target images. The processing device 120 may determine at least one target region based on plurality of ROIs in the plurality of target images. In some embodiments, the processing device 120 may only determine a plurality of ROIs in the left liver region in the target image. In some embodiments, the processing device 120 may only determine a plurality of ROIs in the right liver region in the target image.

In some embodiments, the processing device 120 may determine feature information of the first count of ROIs in the left liver region and the second count of ROIs in the right liver region in the target image. The processing device 120 may transmit the feature information of the first count of ROIs in the left liver region and the second count of ROIs in the right liver region in the target image to a terminal device (e.g., the terminal 140) for display. For example, the first count of ROIs and the second count of ROIs may be marked (e.g., highlighted) in the target segmentation result, and the feature information of the first count of ROIs and the second count of ROIs may also be displayed.

According to some embodiments of the present disclosure, the at least one target region of the liver tissue may be determined by removing the ineffective liver region, the vascular region, and the boundary region from the whole liver region, which may improve the accuracy of the determination of the feature information of the at least one target region based on at least one parameter of the at least one target region. In addition, the feature information of the at least one target region and/or one or more ROIs in the liver segment region, the transverse plane, the coronal plane, or the sagittal plane of the subject may be determined and displayed, which may be convenient for users to view. Furthermore, a plurality of image segmentation algorithms may be used to segment the at least one image to determine the segmentation result, which may improve the accuracy and efficiency of the image segmentation.

FIG. 9 is a schematic diagram illustrating an exemplary process for determining ROIs in a target image according to some embodiments of the present disclosure.

As illustrated in FIG. 9, the processing device 120 may select a slice from a plurality of slices of a target segmentation result as a target image 910. For example, the processing device 120 may select a slice with the largest liver area from the plurality of slices of the target segmentation result as the target image 910. The processing device 120 may determine five regions (e.g., a region 921, a region 923, a region 925, a region 927, a region 929) in the target image 910. The processing device 120 may set an ROI having a diamond shape in each of the five regions in the target image 910. For example, the processing device 120 may determine an ROI 931 in the region 921. The processing device 120 may determine an ROI 933 in the region 923. The processing device 120 may determine an ROI 935 in the region 925. The processing device 120 may determine an ROI 937 in the region 927. The processing device 120 may determine an ROI 939 in the region 929. In some embodiments, the processing device 120 may select one or more ROIs from the plurality of ROIs (e.g., the ROI 931, the ROI 933, the ROI 935, the ROI 937, the ROI 939) in the target image 910 as one or more target regions of liver tissue of a patient.

Figure 10:
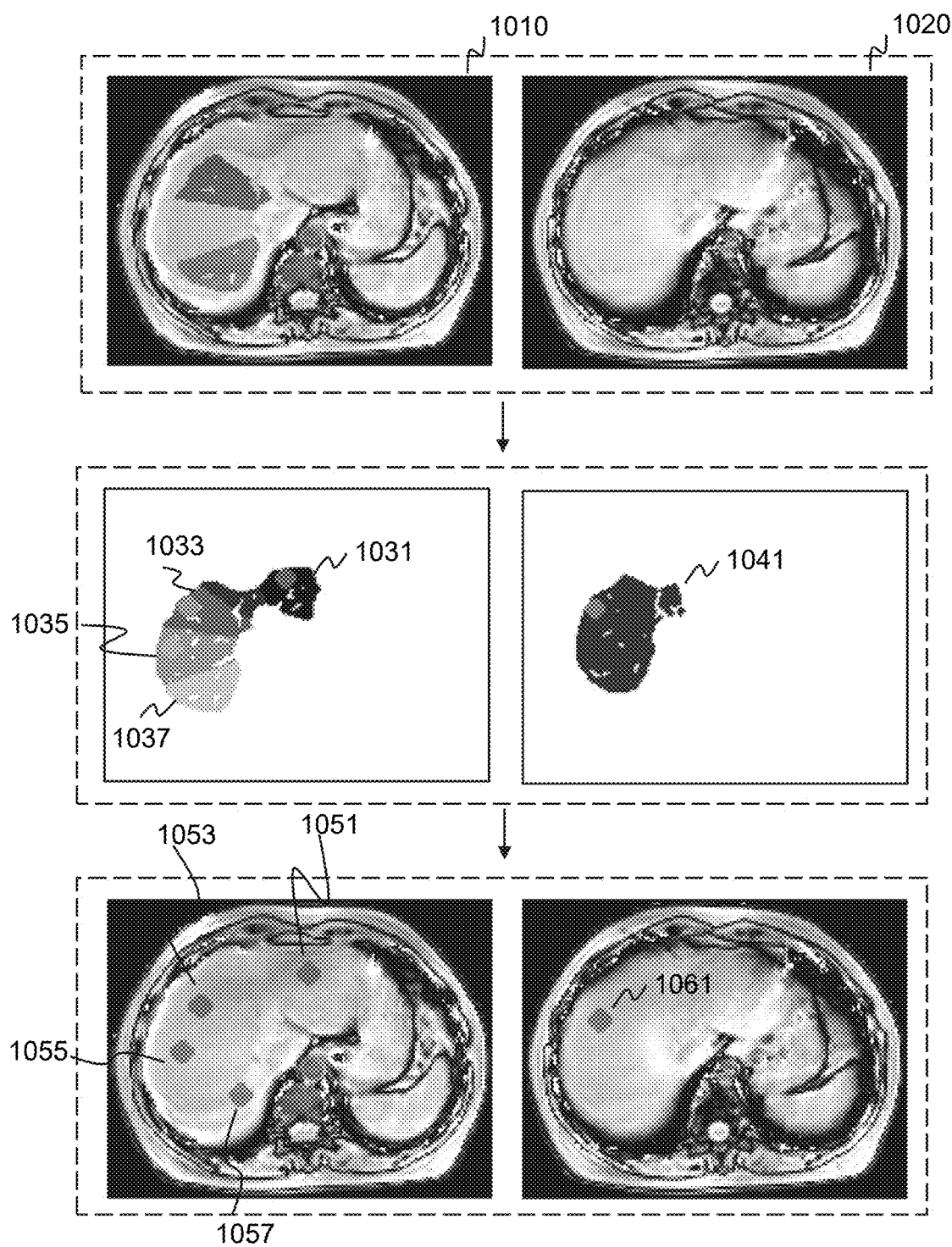
FIG. 10 is a schematic diagram illustrating an exemplary process for determining ROIs in a target image according to some embodiments of the present disclosure.

FIG. 10 is a schematic diagram illustrating an exemplary process for determining ROIs in a target image according to some embodiments of the present disclosure.

As illustrated in FIG. 10, the processing device 120 may select two slices from a plurality of slices of a target segmentation result as a first target image 1010 and a second target image 1020. For example, the processing device 120 may select a slice with the largest liver area from the plurality of slices of the target segmentation result as the first target image 1010. The processing device 120 may select a slice located at the golden section position of liver tissue from the plurality of slices of the target segmentation result as the second target image 1020. The processing device 120 may determine four regions (e.g., a region 1031, a region 1033, a region 1035, a region 1037) in the first target image 1010. The processing device 120 may determine one region (e.g., a region 1041) in the second target image 1020. The processing device 120 may set an ROI having a diamond shape in each of the four regions in the first target image 1010. For example, the processing device 120 may determine an ROI 1051 in the region 1031. The processing device 120 may determine an ROI 1053 in the region 1033. The processing device 120 may determine an ROI 1055 in the region 1035. The processing device 120 may determine an ROI 1057 in the region 1037. The processing device 120 may set an ROI 1061 having a diamond shape in the region 1041 in the second target image 1020. In some embodiments, the processing device 120 may select one or more ROIs from the plurality of ROIs (e.g., the ROI 1051, the ROI 1053, the ROI 1055, the ROI 1057, the ROI 1061) in the first target image 1010 and the second target image 1020 as one or more target regions of the liver tissue of a patient.

Figure 11:
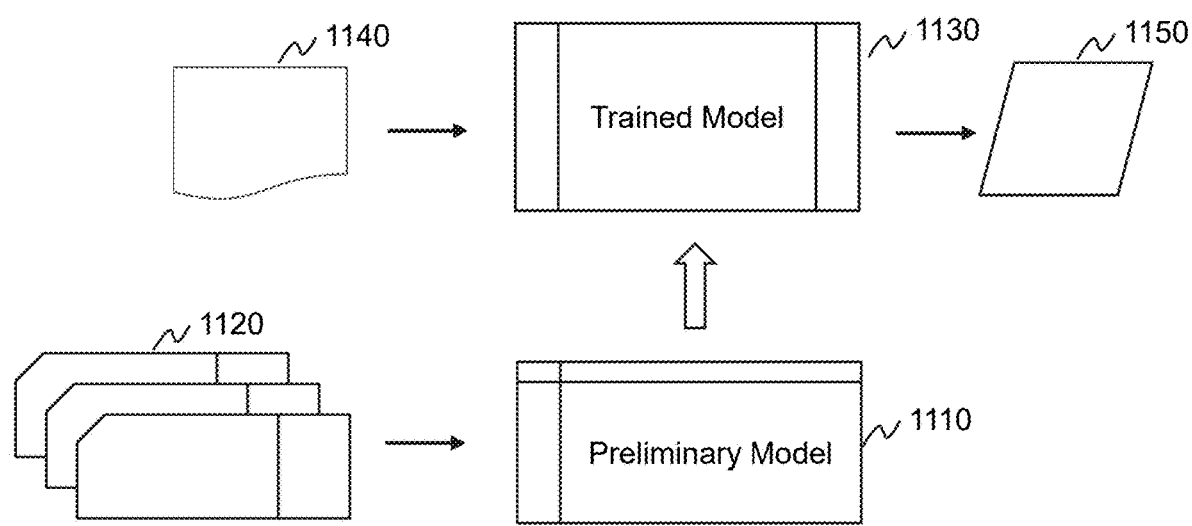
FIG. 11 is a schematic diagram illustrating an exemplary process for training a model according to some embodiments of the present disclosure.

FIG. 11 is a schematic diagram illustrating an exemplary process for training a model according to some embodiments of the present disclosure.

In 1110, the processing device 120 (e.g., the training module 440) may obtain a preliminary model.

As used herein, a preliminary model refers to a machine learning model to be trained. In some embodiments, the preliminary model may include a preliminary segmentation model (e.g., a first preliminary segmentation model, a second preliminary segmentation model), a preliminary image registration model, a preliminary falciform ligament recognition model, a preliminary vascular recognition model, a preliminary liver segment recognition model, or the like.

In some embodiments, the processing device 120 may initialize one or more parameter values of one or more parameters in the preliminary model. Exemplary parameters in the preliminary model may include a learning rate, a batch size, or the like. In some embodiments, the initialized values of the parameters may be default values determined by the medical system 100 or preset by a user of the medical system 100. In some embodiments, the processing device 120 may obtain the preliminary model from a storage device (e.g., the storage device 130) of the medical system 100 and/or an external storage device via the network 150.

In 1120, the processing device 120 (e.g., the training module 440) may obtain a plurality of groups of training samples. The plurality of groups of training samples may be used to train the preliminary model.

In some embodiments, for the preliminary segmentation model, each group of the plurality of groups of training samples may include a sample image of a sample subject and a reference segmentation result. As used herein, a sample subject refers to a subject whose data is used for training the preliminary model. The sample image may be a morphological image, a functional image, or the like. The reference segmentation result may include a reference region representative of the sample subject (e.g., liver tissue of a patient) segmented from the sample image. In some embodiments, a user of the medical system 100 may identify and mark the sample subject in the sample image to generate the reference segmentation result. In some embodiments, the processing device 120 may identify and mark the sample subject in the sample image according to an image analysis algorithm (e.g., an image segmentation algorithm, a feature point extraction algorithm) to generate the reference segmentation result. For example, for the first preliminary segmentation model, each group of the plurality of groups of training samples may include a first sample image and a reference preliminary segmentation result. For example, the reference preliminary segmentation result may include a whole liver region segmented from the first sample image. As another example, for the second preliminary segmentation model, each group of the plurality of groups of training samples may include a second sample image (or a sample preliminary segmentation result) and a reference target segmentation result. For example, the reference target segmentation result may include an effective liver region generated by removing an ineffective liver region from a whole liver region in the second sample image.

In some embodiments, for the preliminary image registration model, each group of the plurality of groups of training samples may include a sample functional image of a sample subject, a sample morphological image of the sample subject, and a reference registration result (e.g., a reference deformation field). In some embodiments, the reference registration result may be determined based on the sample functional image and the sample morphological image according to one or more existing registration algorithms.

In some embodiments, for the preliminary falciform ligament recognition model, each group of the plurality of groups of training samples may include a third sample image (or a sample target segmentation result) and a reference falciform ligament recognition result. In some embodiments, a user of the medical system 100 or the processing device 120 may identify and mark the falciform ligament in the third sample image to generate the reference falciform ligament recognition result.

In some embodiments, for the preliminary vascular recognition model, each group of the plurality of groups of training samples may include a fourth sample image (or a sample target segmentation result) and a reference vascular recognition result. In some embodiments, a user of the medical system 100 or the processing device 120 may identify and mark the vascular in the fourth sample image to generate the reference vascular recognition result.

In some embodiments, for the preliminary liver segment recognition model, each group of the plurality of groups of training samples may include a fifth sample image (or a sample target segmentation result) and a reference liver segment recognition result. In some embodiments, a user of the medical system 100 or the processing device 120 may identify and mark the liver segment in the fifth sample image to generate the reference liver segment recognition result.

In 1130, the processing device 120 (e.g., the training module 440) may generate a trained model by training the preliminary model with the plurality of groups of training samples.

In some embodiments, the trained model may include a segmentation model (e.g., a first segmentation model, a second segmentation model), an image registration model, a falciform ligament recognition model, a vascular recognition model, a liver segment recognition model, or the like.

In some embodiments, the processing device 120 may determine the trained model by training the preliminary model according to an iterative operation including one or more iterations. Taking a current iteration of the one or more iterations of the training of the preliminary segmentation model as an example, the processing device 120 may obtain an updated preliminary segmentation model generated in a previous iteration. The processing device 120 may input a sample image in a group of training samples into the updated preliminary segmentation model, and the updated preliminary segmentation model may output a sample segmentation result by processing the sample image. The processing device 120 may determine a value of a loss function based on the sample segmentation result and a reference segmentation result in the group of training samples. For example, the sample image may be inputted into an input layer of the updated preliminary segmentation model, and the reference segmentation result corresponding to the sample image may be inputted into an output layer of the updated preliminary segmentation model as a desired output of the updated preliminary segmentation model. The updated preliminary model may extract one or more image features (e.g., a low-level feature (e.g., an edge feature, a texture feature), a high-level feature (e.g., a semantic feature), or a complicated feature (e.g., a deep hierarchical feature) included in the sample image. Based on the extracted image features, the updated preliminary segmentation model may determine a predicted output (i.e., the sample segmentation result) of the sample image. The predicted output (i.e., the sample segmentation result) may then be compared with the desired output (e.g., the reference segmentation result) based on the loss function. As used herein, a loss function of a model may be configured to assess a difference between a predicted output (e.g., the sample segmentation result) of the model and a desired output (e.g., the reference segmentation result). In some embodiments, the loss function may include a cross-entropy loss function, an exponential loss function, a logarithmic loss function, a mean square error (MSE), a mean absolute error (MAE), or the like.

In some embodiments, the plurality of iterations may be performed to update the parameter values of the preliminary segmentation model (or the updated preliminary segmentation model) until a termination condition is satisfied. The termination condition may provide an indication of whether the preliminary segmentation model (or the updated preliminary segmentation model) is sufficiently trained. The termination condition may relate to the loss function or an iteration count of the iterative process or training process. For example, the termination condition may be satisfied if the value of the loss function associated with the preliminary segmentation model (or the updated preliminary segmentation model) is minimal or smaller than a threshold (e.g., a constant). As another example, the termination condition may be satisfied if the value of the loss function converges. The convergence may be deemed to have occurred if the variation of the values of the loss function in two or more consecutive iterations is smaller than a threshold (e.g., a constant). As still another example, the termination condition may be satisfied when a specified number (or count) of iterations are performed in the training process.

In response to determining that the termination condition is not satisfied, the processing device 120 may update the updated preliminary segmentation model based on the value of the loss function. For example, parameter values of the updated preliminary segmentation model may be adjusted and/or updated in order to decrease the value of the loss function to smaller than the threshold, and a new updated preliminary segmentation model may be generated. Accordingly, in the next iteration, another group of training samples may be input into the new updated preliminary segmentation model to train the new updated preliminary segmentation model as described above.

In response to determining that the termination condition is satisfied, the processing device 120 may designate the updated preliminary segmentation model as the segmentation mode. For example, parameter values of the updated preliminary segmentation model may be designated as parameter values of the segmentation model.

In some embodiments, the processing device 120 may determine the trained model by training the preliminary model according to a gradient descent algorithm (e.g., a standard gradient descent algorithm, a random gradient descent algorithm). In some embodiments, the processing device 120 may determine the trained model by training the preliminary model according to a learning rate decay algorithm (e.g., an exponential decay algorithm, a natural exponential decay algorithm, a polynomial decay algorithm, a cosine decay algorithm, a linear cosine decay algorithm, a piecewise decay algorithm).

In an application process of the trained model, in 1140, the processing device 120 may obtain an image (e.g., at least one image as described in operation 510, a preliminary segmentation result or a target segmentation result as described in FIG. 7). The processing device 120 may input the image into the trained model. In 1150, the trained model may process the image, and output a result (e.g., a segmentation result, a plurality of liver segment regions of liver tissue in the image, a falciform ligament of the liver tissue in the image, a vascular region in the image).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the segmentation model (e.g., the first segmentation model, the second segmentation model), the falciform ligament recognition model, the vascular recognition model, the liver segment recognition model may be trained independently or jointly. In some embodiments, the first segmentation model and the second segmentation model may be trained jointly. Each group of the plurality of groups of training samples may include a sixth sample image and a reference target segmentation result. For example, the sixth sample image may be a morphological image, a functional image, or the like, of the sample subject (e.g., liver tissue of a patient). The reference target segmentation result may include an effective liver region generated by removing an ineffective liver region from a whole liver region in the sixth sample image.

In some embodiments, the first segmentation model, the second segmentation model, and the liver segment recognition model may be trained jointly. Each group of the plurality of groups of training samples may include a seventh sample image and a reference result. For example, the seventh sample image may be a morphological image, a functional image, or the like, of the sample subject (e.g., liver tissue of a patient). The reference result may include an effective liver region in at least one liver segment of the seventh sample image.

In some embodiments, the first segmentation model, the second segmentation model, and the vascular recognition model may be trained jointly.

Each group of the plurality of groups of training samples may include an eighth sample image and a second reference result. For example, the eighth sample image may be a morphological image, a functional image, or the like, of the sample subject (e.g., liver tissue of a patient). The second reference result may include a liver region in the eighth sample image generated by removing an ineffective liver region and a vascular region from a whole liver region in the eighth sample image.

In some embodiments, the generation, training, and/or updating of a model (e.g., the segmentation model, the falciform ligament recognition model, the vascular recognition model, the liver segment recognition model, the image registration model) may be performed on a processing device, while the application of the model may be performed on another processing device. In some embodiments, the generation and/or updating of the model may be performed on a processing device of a system different from the medical system 100 or a server different from a server including the processing device 120 on which the application of the model is performed. For instance, the generation and/or updating of the model may be performed on a first system of a vendor who provides and/or maintains such a model and/or has access to training samples used to generate the model, while image processing based on the provided model may be performed on a second system of a client of the vendor. In some embodiments, the generation and/or updating of the model may be performed on a first processing device of the medical system 100, while the application of the model may be performed on a second processing device of the medical system 100. In some embodiments, the generation and/or updating of the model may be performed online in response to a request for image processing. In some embodiments, the generation and/or updating of the model may be performed offline.

In some embodiments, the model may be generated, trained, and/or updated (or maintained) by, e.g., the manufacturer of the medical device 110 or a vendor. For instance, the manufacturer or the vendor may load the model into the medical system 100 or a portion thereof (e.g., the processing device 120) before or during the installation of the medical device 110 and/or the processing device 120, and maintain or update the model from time to time (periodically or not). The maintenance or update may be achieved by installing a program stored on a storage device (e.g., a compact disc, a USB drive) or retrieved from an external source (e.g., a server maintained by the manufacturer or vendor) via the network 150. The program may include a new model (e.g., a new segmentation model, a new falciform ligament recognition model, a new vascular recognition model, a new liver segment recognition model, a new image registration model) or a portion thereof that substitutes or supplements a corresponding portion of the model.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for feature information determination, which is implemented on a computing device including at least one processor and at least one storage device, the method comprising:
    obtaining at least one image including a subject, the subject including liver tissue, the at least one image including a first image;
    determining a preliminary segmentation result including a preliminary region representative of the liver tissue by inputting the first image into a first segmentation model;
    determining a target segmentation result by inputting the preliminary segmentation result into a second segmentation model, the target segmentation result including an effective liver region of the liver tissue, the effective liver region being a region of the liver tissue that excludes a liver lesion region;
    determining a target image based on the target segmentation result;
    determining at least one target region in the target image; and
    analyzing the liver tissue of the subject by determining feature information of the at least one target region based on at least one parameter of the at least one target region.

2. The method of claim 1, wherein the at least one image includes a morphological image, and the determining feature information of the at least one target region based on at least one parameter of the at least one target region comprises:
    obtaining a functional image corresponding to the morphological image;
    determining at least one second target region in the functional image corresponding to the at least one target region in the morphological image by registering the functional image and the morphological image;
    designating at least one parameter of the at least one second target region in the functional image as the at least one parameter of the at least one target region in the morphological image; and
    determining the feature information of the at least one target region based on the at least one parameter of the at least one target region.

3. The method of claim 2, wherein
    the morphological image includes at least one of a magnetic resonance imaging (MRI) image, or a computed tomography (CT) image; and
    the functional image includes at least one of a diffusion functional image, a perfusion functional image, or a fat functional image.

4. The method of claim 1, wherein the at least one image includes a functional image, and the determining feature information of the at least one target region based on at least one parameter of the at least one target region comprises:
obtaining the at least one parameter of the at least one target region in the functional image; and
determining the feature information of the at least one target region based on the at least one parameter of the at least one target region.

5. The method of claim 1, further comprising:
outputting a report based on the feature information of the at least one target region.

6. The method of claim 1, wherein the at least one image further includes a second image, and the determining a target segmentation result by inputting the preliminary segmentation result into a second segmentation model comprises:
processing the second image based on the preliminary segmentation result to generate a processed second image; and
determining the target segmentation result by segmenting the processed second image using the second segmentation model.

7. The method of claim 1, further comprising:
identifying a falciform ligament of the liver tissue based on the at least one image using a falciform ligament recognition model.

8. The method of claim 7, wherein
the target segmentation result is a 3D image including a plurality of slices of the subject,
the determining a target image based on the target segmentation result comprises:
determining a left liver region and a right liver region in the target segmentation result based on the falciform ligament of the liver tissue; and
selecting a slice from the plurality of slices of the target segmentation result as the target image based on feature information of the plurality of slices; and
the determining the at least one target region in the target image comprises:
determining a first count of regions of interest (ROIs) in the left liver region in the target image and a second count of ROIs in the right liver region in the target image based on an area ratio of the left liver region and the right liver region in the target image; and
determining the at least one target region based on the first count of ROIs in the left liver region in the target image and the second count of ROIs in the right liver region in the target image.

9. The method of claim 1, wherein the determining a target image based on the target segmentation result comprises:
identifying a vascular region in the target segmentation result using a vascular recognition model; and
determining the target image by removing the vascular region from the target segmentation result.

10. The method of claim 1, wherein the determining the at least one target region in the target image comprises:
dividing the target image into a plurality of sub-regions;
determining at least one ROI in each of the plurality of sub-regions based on a count of ROIs and a size of an ROI, wherein the count of ROIs and the size of the ROI are set manually or determined in advance; and
determining the at least one target region based on a plurality of ROIs in the plurality of sub-regions.

11. The method of claim 10, wherein the determining at least one ROI in each of the plurality of sub-regions based on a count of ROIs and a size of an ROI comprises:
for each sub-region of the plurality of sub-regions,
determining a plurality of candidate ROIs in the sub-region;
selecting at least one candidate ROI from the plurality of candidate ROIs in the sub-region based on the count of ROIs and the size of the ROI as the at least one ROI in the sub-region.

12. The method of claim 1, wherein the determining a target image based on the target segmentation result comprises:
determining a plurality of liver segment regions of the liver tissue by inputting the target segmentation result into a liver segment recognition model; and
selecting at least one liver segment region from the plurality of liver segment regions of the liver tissue as the target image.

13. The method of claim 1, wherein the target segmentation result is a 3D image including a plurality of slices of the subject, and the target image is at least one slice selected from the plurality of slices.

14. The method of claim 13, wherein the at least one slice is selected from the plurality of slices by at least one:
selecting a slice with a largest size from the plurality of slices;
selecting a slice with a largest liver area from the plurality of slices;
selecting a slice in a middle location of the plurality of slices; or
selecting a slice located at a golden section position of the liver tissue from the plurality of slices.

15. The method of claim 13, wherein
the liver tissue includes a left liver region and a right liver region, and
the determining the at least one target region in the target image comprises:
determining a first count of regions of interest (ROIs) in the left liver region in the target image and a second count of ROIs in the right liver region in the target image based on an area ratio of the left liver region and the right liver region in the target image; and
determining the at least one target region based on the first count of ROIs in the left liver region in the target image and the second count of ROIs in the right liver region in the target image.

16. The method of claim 1, wherein the first segmentation model and the second segmentation model are trained jointly using a plurality of groups of training samples, each group of training samples including a sample image of a sample liver tissue and a reference target segmentation result including a sample effective liver region.

17. A system for feature information determination, comprising:
at least one storage medium including a set of instructions; and
at least one processor in communication with the at least one storage medium, wherein when executing the set of instructions, the at least one processor is directed to cause the system to perform operations comprising:
obtaining at least one image including a subject, the subject including liver tissue, the at least one image including a first image;
determining a preliminary segmentation result including a preliminary region representative of the liver tissue by inputting the first image into a first segmentation model;
determining a target segmentation result by inputting the preliminary segmentation result into a second segmentation model, wherein the target segmentation result includes an effective liver region of the liver tissue, the effective liver region is a region of the liver tissue that excludes a liver lesion region, the second segmentation model is generated by training a preliminary segmentation model with a plurality of groups of training samples, each group of training samples includes a sample preliminary segmentation result of a sample liver tissue and a reference target segmentation result including a sample effective liver region;

determining a target image based on the target segmentation result;

determining at least one target region in the target image; and analyzing the liver tissue of the subject by determining feature information of the at least one target region based on at least one parameter of the at least one target region.

18. The system of claim 17, wherein the at least one image includes a morphological image, and the determining feature information of the at least one target region based on at least one parameter of the at least one target region comprises:

obtaining a functional image corresponding to the morphological image;

determining at least one second target region in the functional image corresponding to the at least one target region in the morphological image by registering the functional image and the morphological image;

designating at least one parameter of the at least one second target region in the functional image as the at least one parameter of the at least one target region in the morphological image; and determining the feature information of the at least one target region based on the at least one parameter of the at least one target region.

19. The system of claim 17, wherein the at least one image includes a functional image, and the determining feature information of the at least one target region based on at least one parameter of the at least one target region comprises:

obtaining the at least one parameter of the at least one target region in the functional image; and determining the feature information of the at least one target region based on the at least one parameter of the at least one target region.

20. A non-transitory computer readable medium, comprising executable instructions that, when executed by at least one processor, direct the at least one processor to perform a method for feature information determination, the method comprising:

obtaining at least one image including a subject, the subject including liver tissue, the at least one image including a first image;

determining a preliminary segmentation result including a preliminary region representative of the liver tissue by inputting the first image into a first segmentation model;

determining a target segmentation result by inputting the preliminary segmentation result into a second segmentation model, the target segmentation result including an effective liver region of the liver tissue, the effective liver region being a region of the liver tissue that excludes a liver lesion region;

determining a target image based on the target segmentation result, the target segmentation result being a 3D image including a plurality of slices of the subject, and the target image being at least one slice selected from the plurality of slices;

determining at least one target region in the target image; and analyzing the liver tissue of the subject by determining feature information of the at least one target region based on at least one parameter of the at least one target region.

* * * * *